(12) United States Patent
Artwohl et al.

(10) Patent No.: US 9,052,536 B2
(45) Date of Patent: *Jun. 9, 2015

(54) DISPLAY CASE DOOR WITH TRANSPARENT LCD PANEL

(71) Applicant: Anthony, Inc., Sylmar, CA (US)

(72) Inventors: Paul J. Artwohl, Stevensville, MI (US); Jeffery W. Nicholson, Palmdale, CA (US); Mark Sandnes, Granada Hills, CA (US)

(73) Assignee: Anthony, Inc., Sylmar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/170,378

(22) Filed: Jan. 31, 2014

(65) Prior Publication Data

US 2014/0144083 A1 May 29, 2014

Related U.S. Application Data

(63) Continuation-in-part of application No. 13/286,053, filed on Oct. 31, 2011, now Pat. No. 8,683,745.

(60) Provisional application No. 61/484,616, filed on May 10, 2011.

(51) Int. Cl.
*G09F 23/00* (2006.01)
*G02F 1/13* (2006.01)
(Continued)

(52) U.S. Cl.
CPC ............ *G02F 1/1313* (2013.01); *A47F 3/0434* (2013.01); *A47F 11/06* (2013.01); *G09F 9/35* (2013.01); *G09G 3/003* (2013.01); *G09G 3/3406* (2013.01); *G09G 2300/023* (2013.01); *G09G 2300/0426* (2013.01); *G09F 23/065* (2013.01); *G09F 23/0058* (2013.01)

(58) Field of Classification Search
CPC .............. F25D 23/02; F25D 2400/361; G09F 2013/045; G09F 9/35; G09F 19/04; G09F 23/0426; G09G 2300/04; G09G 5/00; G09G 2300/023; F21W 2131/305; F09F 2023/0033; F09G 2300/023
USPC ........ 52/204.1, 204.5, 786.11, 786.13; 49/70, 49/501, 504; 312/116, 138.1, 405, 401; 345/104, 173; 349/90, 106; 362/92, 362/125, 97.2, 97.4
See application file for complete search history.

(56) References Cited

U.S. PATENT DOCUMENTS 2,002,322 A * 5/1935 Kraemer .......................... 49/352
4,371,870 A * 2/1983 Biferno ............................ 345/4
(Continued)

FOREIGN PATENT DOCUMENTS

JP 2003-125904 5/2003

*Primary Examiner* — James Ference
(74) *Attorney, Agent, or Firm* — Foley & Lardner LLP

(57) ABSTRACT

An improved display case door assembly for a product storage device. The display case door assembly includes a transparent unit comprising a front panel, a rear panel, and a transparent LCD panel positioned between the front panel and the rear panel. The transparent LCD panel is configured to present visual media content. The display case door assembly further includes a lighting element configured to provide lighting for the transparent LCD panel and for products within the product storage device and a light guide configured to selectively direct light emitted from the lighting element toward the transparent LCD panel and the products within the product storage device.

19 Claims, 13 Drawing Sheets

(51) Int. Cl.
*A47F 3/04* (2006.01)
*A47F 11/06* (2006.01)
*G09F 9/35* (2006.01)
*G09G 3/00* (2006.01)
*G09G 3/34* (2006.01)
*G09F 23/06* (2006.01)

(56) References Cited

U.S. PATENT DOCUMENTS

| | | | | |
|---|---|---|---|---|
| 4,671,582 | A * | 6/1987 | Stromquist et al. | 439/31 |
| 4,893,902 | A * | 1/1990 | Baughman et al. | 349/16 |
| 4,998,382 | A * | 3/1991 | Kostos et al. | 49/501 |
| 5,024,023 | A * | 6/1991 | Kostos et al. | 49/501 |
| 5,111,618 | A * | 5/1992 | Kaspar et al. | 49/501 |
| 5,116,274 | A * | 5/1992 | Artwohl et al. | 312/116 |
| 5,255,473 | A * | 10/1993 | Kaspar et al. | 49/501 |
| 5,270,843 | A * | 12/1993 | Wang | 349/90 |
| 5,645,330 | A * | 7/1997 | Artwohl et al. | 312/116 |
| 6,005,652 | A * | 12/1999 | Matsuhira | 349/149 |
| 6,148,563 | A * | 11/2000 | Roche et al. | 49/501 |
| 6,377,228 | B1 * | 4/2002 | Jenkin et al. | 345/1.3 |
| 6,401,399 | B1 | 6/2002 | Roche et al. | |
| 6,427,772 | B1 * | 8/2002 | Oden et al. | 165/232 |
| 6,475,087 | B1 * | 11/2002 | Cole | 463/20 |
| 6,476,885 | B1 * | 11/2002 | Murray et al. | 349/60 |
| 6,606,832 | B2 | 8/2003 | Richardson et al. | |
| 6,606,833 | B2 * | 8/2003 | Richardson et al. | 52/204.5 |
| 6,874,903 | B2 * | 4/2005 | Yang et al. | 362/604 |
| 7,072,096 | B2 * | 7/2006 | Holman et al. | 359/298 |
| 7,121,675 | B2 * | 10/2006 | Ter-Hovhannisian | 362/92 |
| 7,319,407 | B2 * | 1/2008 | Jang et al. | 340/691.1 |
| 7,413,233 | B1 * | 8/2008 | Jung | 296/97.7 |
| 7,513,637 | B2 * | 4/2009 | Kelly et al. | 362/126 |
| 7,824,056 | B2 | 11/2010 | Madireddi et al. | |
| 7,870,686 | B2 * | 1/2011 | Hines | 40/453 |
| 7,934,384 | B2 * | 5/2011 | Tuskiewicz et al. | 62/3.2 |
| 2001/0010516 | A1 | 8/2001 | Roh et al. | 345/169 |
| 2001/0052741 | A1 * | 12/2001 | Yun | 312/405 |
| 2002/0007486 | A1 * | 1/2002 | Yun | 725/26 |
| 2003/0038912 | A1 * | 2/2003 | Broer et al. | 349/122 |
| 2003/0117790 | A1 * | 6/2003 | Lee et al. | 362/31 |
| 2003/0205059 | A1 * | 11/2003 | Roche et al. | 65/60.1 |
| 2003/0207090 | A1 * | 11/2003 | Arora | 428/195.1 |
| 2003/0214619 | A1 * | 11/2003 | Masuda et al. | 349/153 |
| 2004/0073334 | A1 * | 4/2004 | Terranova | 700/236 |
| 2004/0093379 | A1 * | 5/2004 | Roh et al. | 709/203 |
| 2004/0144328 | A1 * | 7/2004 | Bonner et al. | 119/455 |
| 2004/0160388 | A1 * | 8/2004 | O'Keeffe | 345/30 |
| 2004/0194388 | A1 | 10/2004 | Roche et al. | |
| 2005/0068629 | A1 * | 3/2005 | Fernando et al. | 359/609 |
| 2005/0172654 | A1 * | 8/2005 | Rohrer et al. | 62/246 |
| 2005/0202178 | A1 * | 9/2005 | Roche et al. | 427/385.5 |
| 2005/0265019 | A1 * | 12/2005 | Sommers et al. | 362/217 |
| 2006/0103269 | A1 * | 5/2006 | Artwohl et al. | 312/116 |
| 2006/0127586 | A1 | 6/2006 | Roche et al. | |
| 2006/0145576 | A1 * | 7/2006 | Lee et al. | 312/406 |
| 2006/0192767 | A1 * | 8/2006 | Murakami | 345/173 |
| 2007/0003700 | A1 | 1/2007 | Roche et al. | |
| 2007/0016478 | A1 * | 1/2007 | Hill | 705/14 |
| 2007/0024822 | A1 * | 2/2007 | Cortenraad et al. | 353/79 |
| 2007/0058114 | A1 * | 3/2007 | Niiyama et al. | 349/106 |
| 2007/0076431 | A1 * | 4/2007 | Atarashi et al. | 362/613 |
| 2007/0151274 | A1 * | 7/2007 | Roche et al. | 62/246 |
| 2007/0171647 | A1 * | 7/2007 | Artwohl et al. | 362/276 |
| 2007/0195535 | A1 * | 8/2007 | Artwohl et al. | 362/341 |
| 2007/0216657 | A1 * | 9/2007 | Konicek | 345/173 |
| 2008/0024047 | A1 * | 1/2008 | Juo et al. | 312/405 |
| 2008/0158858 | A1 * | 7/2008 | Madireddi et al. | 362/92 |
| 2009/0002990 | A1 * | 1/2009 | Becker et al. | 362/249 |
| 2009/0036208 | A1 * | 2/2009 | Pennington et al. | 463/33 |
| 2009/0052206 | A1 * | 2/2009 | Matsui et al. | 362/612 |
| 2009/0121970 | A1 * | 5/2009 | Ozbek | 345/4 |
| 2009/0146945 | A1 * | 6/2009 | Cho | 345/104 |
| 2009/0276319 | A1 * | 11/2009 | Lungu et al. | 705/14.73 |
| 2009/0295731 | A1 * | 12/2009 | Kim et al. | 345/168 |
| 2010/0013925 | A1 * | 1/2010 | Fowler et al. | 348/143 |
| 2010/0026912 | A1 * | 2/2010 | Ho | 348/836 |
| 2010/0043293 | A1 * | 2/2010 | Nicholson et al. | 49/70 |
| 2010/0062152 | A1 | 3/2010 | Roche et al. | |
| 2010/0068378 | A1 | 3/2010 | Roche et al. | |
| 2010/0083672 | A1 * | 4/2010 | Yoon et al. | 62/85 |
| 2010/0119705 | A1 | 5/2010 | Roche et al. | |
| 2010/0152892 | A1 * | 6/2010 | Gavra et al. | 700/232 |
| 2010/0214786 | A1 * | 8/2010 | Nichol | 362/296.01 |
| 2010/0275477 | A1 * | 11/2010 | Kim | 40/541 |
| 2010/0293827 | A1 * | 11/2010 | Suss et al. | 40/593 |
| 2011/0083460 | A1 * | 4/2011 | Thomas et al. | 62/264 |
| 2011/0098849 | A1 * | 4/2011 | Hudis et al. | 700/232 |
| 2011/0116231 | A1 * | 5/2011 | Dunn et al. | 361/695 |
| 2011/0181792 | A1 * | 7/2011 | Hammonds | 348/745 |
| 2012/0105424 | A1 * | 5/2012 | Lee et al. | 345/212 |
| 2012/0285089 | A1 * | 11/2012 | Artwohl et al. | 49/70 |
| 2013/0063326 | A1 * | 3/2013 | Riegel | 345/4 |
| 2013/0271696 | A1 * | 10/2013 | Dunn | 349/58 |
| 2014/0078407 | A1 | 3/2014 | Green et al. | |

* cited by examiner

DISPLAY CASE DOOR WITH TRANSPARENT LCD PANEL

CROSS-REFERENCE TO RELATED PATENT APPLICATIONS

This application is a continuation in part of U.S. patent application Ser. No. 13/286,053 filed Oct. 31, 2011, which claims the benefit of and priority to U.S. Provisional Patent Application No. 61/484,616 filed May 10, 2011. The entireties of U.S. patent application Ser. No. 13/286,053 and U.S. Provisional Patent Application No. 61/484,616 are incorporated by reference herein in.

FIELD

The present disclosure relates generally to temperature-controlled storage devices such as refrigerated display cases as may be found in a supermarket or other similar facility. The present disclosure relates more particularly to a refrigerated display case door with a transparent LCD panel.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Temperature-controlled storage devices (e.g., a refrigerator, freezer, refrigerated merchandiser, display case, etc.) are used in a wide variety of commercial, institutional, and residential applications for storing and/or displaying refrigerated or frozen objects. Many temperature-controlled storage devices have a display case door (e.g., a door with an insulated glass panel) through which objects within the temperature-controlled storage device can be viewed. Traditional display case doors allow a customer in a supermarket or other similar facility to see the objects within the temperature-controlled storage device while shopping, but do not otherwise facilitate product presentation or enhance the shopping experience.

SUMMARY

One implementation of the present disclosure is a display case door assembly for a product storage device. The display case door assembly includes a transparent unit comprising a front panel, a rear panel, and a transparent LCD panel positioned between the front panel and the rear panel. The transparent LCD panel is configured to present visual media content. In some embodiments, the visual media content includes at least one of: product information, pricing information, nutritional information, store layout information, and advertising content. The display case door assembly further includes a lighting element configured to provide lighting for the transparent LCD panel and for products within the product storage device and a light guide configured to selectively direct light emitted from the lighting element toward the transparent LCD panel and the products within the product storage device.

In some embodiments, the lighting element includes a LED strip positioned within the display case door assembly between the front panel and the rear panel. In some embodiments, the lighting element is attached to a surface of the LCD panel and configured to emit light in a direction away from the LCD panel and toward the products within the product storage device. The light guide may be configured to cause the light emitted by the lighting element to be reflected back toward the LCD panel.

In some embodiments, the light guide is positioned within the display case door assembly between the front panel and the rear panel. In some embodiments, selectively directing light emitted from the lighting element toward the transparent LCD panel includes using the light guide to reflect the light toward the LCD panel. Selectively directing light emitted from the lighting element toward the products within the product storage device may include allowing the light to pass through the light guide and into the product storage device.

In some embodiments, the light guide includes a switchable film configured to transition between a transparent state and an opaque state. The switchable film may be applied to at least one of: the front panel, the rear panel, and the transparent LCD panel. Selectively directing light emitted from the lighting element toward the transparent LCD panel may include transitioning the switchable film into the opaque state. Selectively directing light emitted from the lighting element toward the products within the product storage device may include transitioning the switchable film into the transparent state.

In some embodiments, the display case door assembly further includes a controller positioned between the front panel and the rear panel. The controller may be configured to control the visual media content presented via the transparent LCD panel.

In some embodiments, the display case door assembly further includes a speaker attached to the transparent unit. The speaker may be configured to present audio media content.

In some embodiments, the display case door assembly further includes a touch screen configured to receive touch-based input from a user. The visual media content presented by the transparent LCD panel may be presented in response to user input received via the touch screen.

In some embodiments, the display case door assembly further includes a hollow hinge pin configured to rotatably couple the display case door assembly to the product storage device and one or more electrical conductors extending through the hollow hinge pin. The electrical conductors may provide at least one of: power and data to the transparent LCD panel.

In some embodiments, the display case door assembly further includes an insulating medium between the front panel and the rear panel. The insulating medium may be at least one of: an insulating foam and a transparent insulating gas.

In some embodiments, the transparent LCD panel, the lighting element, and the light guide are powered by a power supply that outputs a DC voltage of 24V or less.

Another implementation of the present disclosure is a display case door assembly for a temperature-controlled storage device. The display case door assembly includes a transparent unit comprising a panel through which products within the temperature-controlled storage device are visible and an electroacoustic transducer mounted in energy transmitting relation to the panel. The electroacoustic transducer may be configured to receive an audio signal and to drive the panel to produce sound in response to the audio signal. The display case door assembly further includes a controller for the electroacoustic transducer. The controller is configured to affect the audio signal received by the electroacoustic transducer.

In some embodiments, the display case door assembly further includes a sensor. The controller may be configured to receive an input signal from the sensor and to detect a user in front of the transparent unit based on the input signal. The controller may affect the audio signal received by the electroacoustic transducer in response to detecting a user in front of the transparent unit.

In some embodiments, the display case door assembly further includes an anti-condensate device comprising an electrically-conductive coating applied to the panel. The electrically-conductive coating may be configured to generate heat to prevent condensation from occurring.

In some embodiments, the display case door assembly further includes an anti-reflective coating applied to the panel. The anti-reflective coating may be configured to increase an amount of visible light transmitted through the panel.

Another implementation of the present disclosure is a transparent unit including a transparent panel and a transparent LCD panel coupled to the transparent panel. The transparent LCD panel may be configured to present visual media content. The transparent unit further includes a switchable film configured to transition between a transparent state and an opaque state. The switchable film is applied to at least one of: the transparent panel and the transparent LCD panel. The transparent unit further includes a controller configured to provide a control signal to the switchable film to cause the switchable film to transition between the transparent state and the opaque state. The controller is configured to control the visual media content presented via the transparent LCD panel and to coordinate the presentation of visual media content with a state of the switchable film.

In some embodiments, the controller is configured to determine whether to cause the switchable film to transition between the transparent state and the opaque state and to provide the control signal to the switchable film based on a result of the determination. The controller may be configured to cause the switchable film to transition into the opaque state when the visual media content is presented via the transparent LCD panel.

In some embodiments, the transparent panel includes an inner transparent portion through which the visual media content presented by the transparent LCD panel is visible and an outer opaque portion configured to conceal the controller. The outer opaque portion may be formed by at least one of: dot matrix decorating and applying a decal to an outer portion of the transparent panel.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
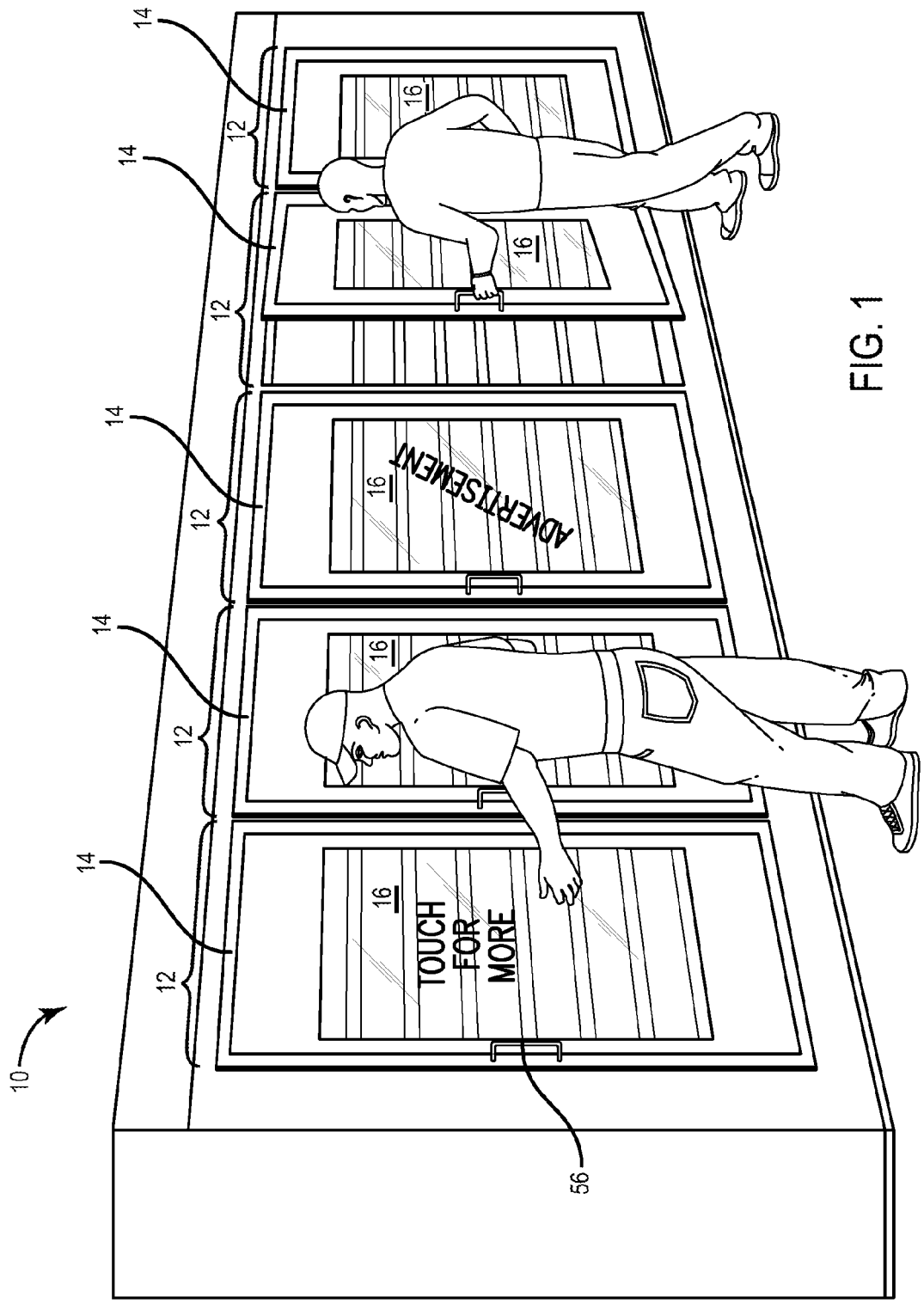
FIG. 1 perspective view of a temperature-controlled storage device having a plurality of display case doors, each of the display case doors including a transparent unit with a transparent LCD panel contained therein, according to an exemplary embodiment.

Referring generally to the FIGURES, a display case door with a transparent liquid crystal display (LCD) panel and components thereof are shown, according to various exemplary embodiments. The display case door described herein may be used as a door for a refrigerator, freezer, refrigerated merchandiser, or other display case in a wide variety of commercial, institutional, and residential applications. For example, the display case door may be used as a door for a temperature-controlled storage device in a supermarket or other similar facility and may include one or more transparent panels or panes (e.g., insulated glass panels) through which objects within the temperature-controlled storage device can be viewed.

The display case door described herein includes a transparent LCD panel as one of the one or more transparent panels or panes. Advantageously, the transparent LCD panel can be used to present electronic content (e.g., product information, pricing, nutritional value, advertisements, store layout information, visual media, etc.) to a customer while allowing a customer to see into the temperature-controlled storage device and view the items contained therein. In some embodiments, the transparent LCD panel is the center panel of a three-pane unit, thereby maximizing visible transmittance while maintaining thermal insulating performance and protecting the LCD panel from impact damage. The transparent LCD panel may be mounted within a hermetically sealed unit to protect against moisture damage.

In various embodiments, the display case door described herein includes one or more electronic components such as sensors (e.g., a camera, a motion sensor, a proximity sensor, a temperature sensor, a microphone, etc.), speakers (e.g., for presenting audio-content to a customer), a touch-sensitive panel (e.g., for receiving a user input), a lighting element (e.g., to illuminate items within the temperature-controlled storage device, to provide lighting for the LCD panel, etc.) an anti-condensate system (e.g., to control condensation on the display case door), a light guide (e.g., to direct light from the lighting element to the items within the temperature-controlled storage device and/or to the LCD panel), and/or a controller to process data inputs and to provide control signals (e.g., operating instructions, data signals, etc.) to the various electronic components. The electronic components may be located between the front and rear panels, embedded in the door frame, or otherwise located.

In some embodiments, portions of the front rear and panels are selectively decorated to conceal any wires or other electronic components within the display case door. For example, the front and rear panels may be darkened or made opaque around a perimeter thereof (e.g. using screen printing, dot matrix decorating, roller printing, ink jet printing, painting, etc.) to hide any electronic components contained between the front and rear panels.

Before discussing further details of the display case door and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

Referring now to FIG. 1, a drawing of a storage device 10 having a plurality of display case doors 12 is shown, according to an exemplary embodiment. In some embodiments, storage device 10 is a temperature-controlled storage device (e.g., a refrigerator, a freezer, a warmer, a heater, etc.) for storing and/or displaying refrigerated, frozen, or heated goods. In other embodiments, storage device 10 may be used to store and/or display products, goods, or other items at room temperature or at an uncontrolled temperature. Storage device 10 may be implemented in any commercial, industrial, or residential facility. For example, as shown in FIG. 1, storage device 10 may be used to store and/or display refrigerated or frozen goods to customers in a supermarket, warehouse store, or other similar facility.

Storage device 10 is shown to include a plurality of display case doors 12. Each display case door 12 is shown to include a door frame 14 and a transparent unit 16. In some embodiments, transparent unit 16 includes one or more panes of transparent or substantially transparent glass (e.g., insulated glass, tempered glass, etc.), plastics, or other transparent or substantially transparent materials. In some embodiments, transparent unit 16 includes multiple layers of transparent panels (i.e., multiple panels per door 12). For example, transparent unit 16 may be a three-pane unit having a front panel, a center panel, and a rear panel.

In some embodiments, transparent unit 16 includes a transparent LCD panel. Advantageously, the transparent LCD panel can be used to present electronic content (e.g., product information, pricing, nutritional value, advertisements, store layout information, visual media, etc.) to a customer while allowing a customer to see into storage device 10 and view the items contained therein. The content presented via the LCD panel may be generated dynamically (e.g., in response to user input and/or sensor signals) and may be updated to include new content (e.g., new advertisements, current product promotions, etc.) via a communications network or other data connection.

In some embodiments, transparent unit 16 includes a touch-sensitive panel. In various embodiments, some or all of the front panel may be touch-sensitive. A user can touch the touch-sensitive panel to access an information system, to retrieve product or nutritional information, to view a store layout, or otherwise interact with display case door 12 and/or the electronic content presented by display case door 12. Transparent unit 16 is described in greater detail with reference to FIGS. 2-4.

Still referring to FIG. 1, in some embodiments, display case door 12 includes a handle 56. Handle 56 may be used to open, close, lock, unlock, seal, unseal, or otherwise operate display case door 12. Display case door 12 may include any of a variety of structures or features for attaching display case door 12 to storage device 10. For example, display case door 12 may include a structure for housing wiring, a mullion, one or more gaskets, and/or other associated brackets and components typically included in refrigerated display cases. Detailed descriptions of such components are provided in U.S. Pat. No. 6,606,832, and U.S. Pat. No. 6,606,833, which are incorporated by reference herein in their entireties.

Figure 2:
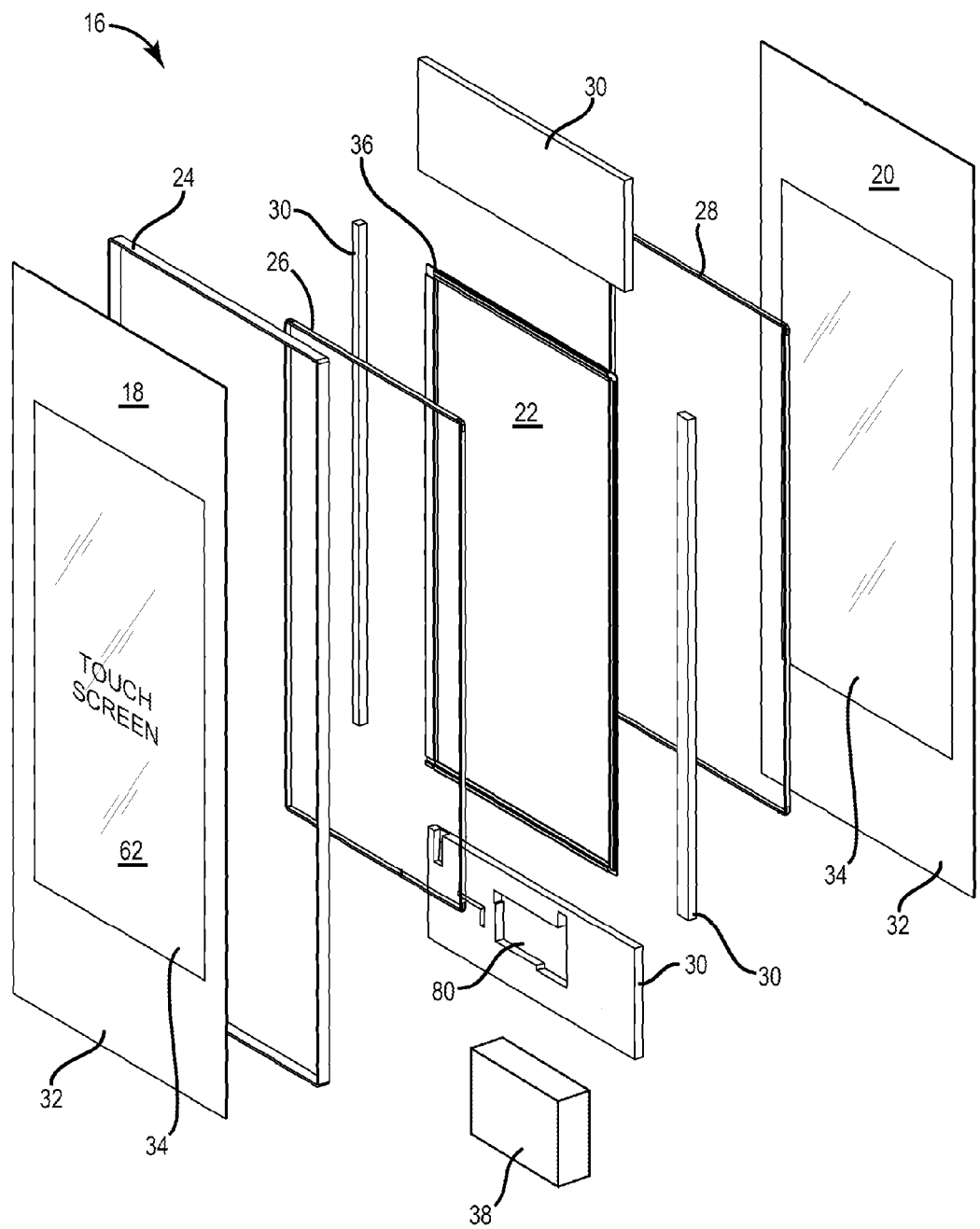
FIG. 2 is an exploded view of the transparent unit of FIG. 1, showing a front panel, a rear panel, and a transparent LCD panel positioned between the front panel and the rear panel, according to an exemplary embodiment.
Figure 3:
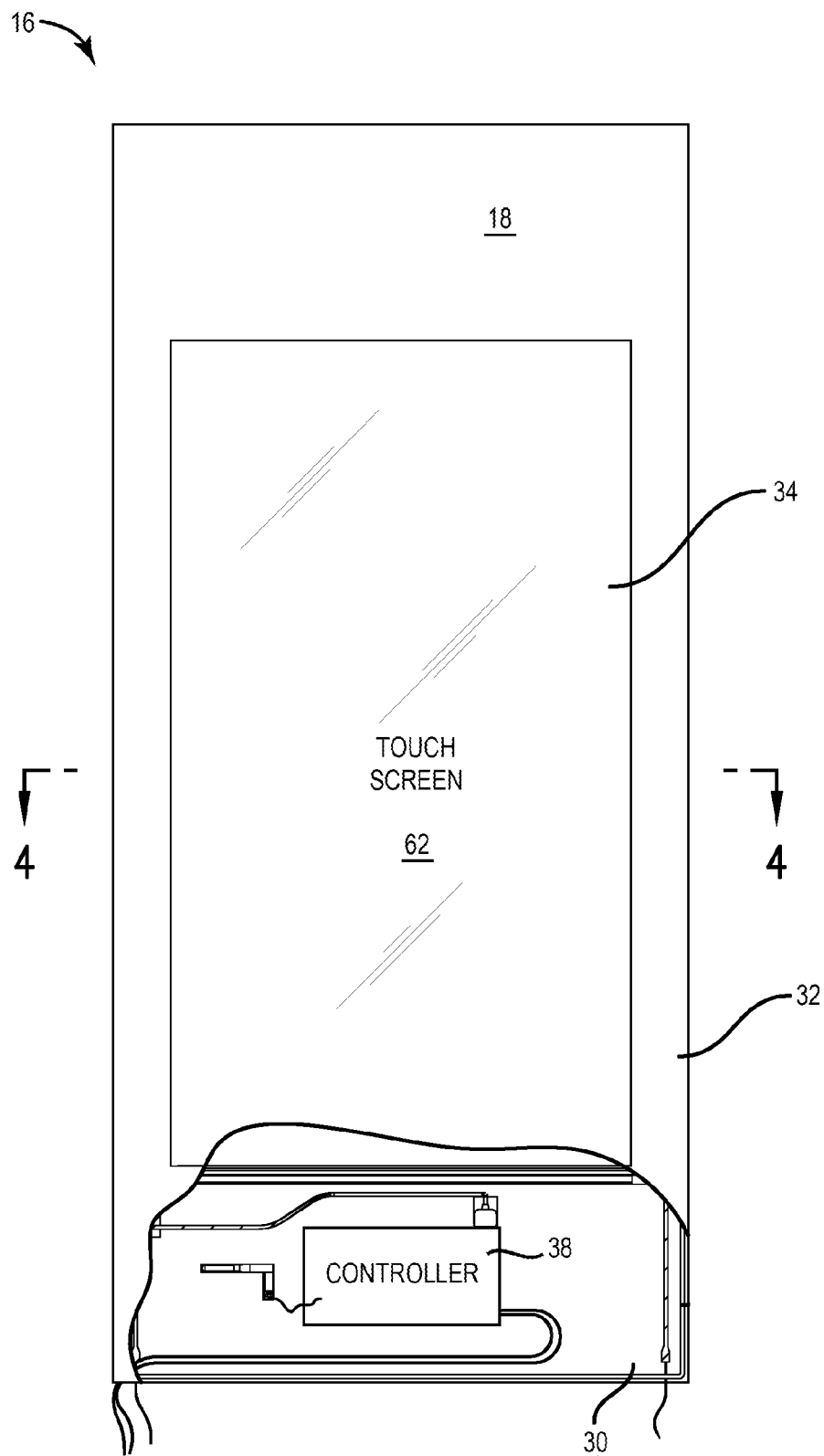
FIG. 3 is a front elevation view of the transparent unit shown in FIG. 2 with a portion of front panel 18 cut away to show a controller housed between the front panel and the rear panel, according to an exemplary embodiment.
Figure 4:
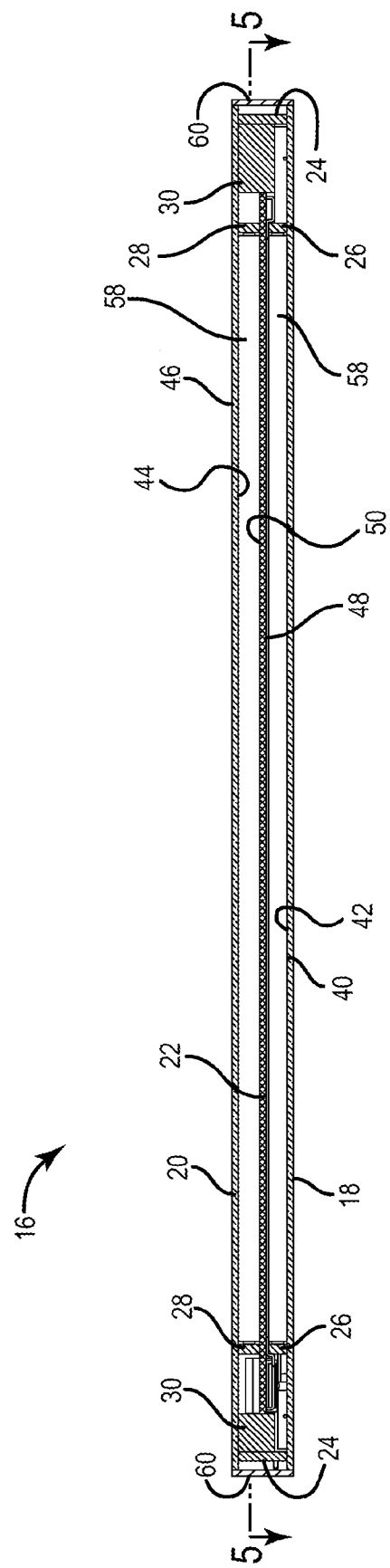
FIG. 4 is a cross-sectional plan view of the transparent unit of FIG. 2, according to an exemplary embodiment.

Referring now to FIGS. 2-4, transparent unit 16 is shown in greater detail, according to an exemplary embodiment. FIG. 2 is an exploded view drawing of transparent unit 16, FIG. 3 is a front view of transparent unit 16, and FIG. 4 is a cross-sectional plan view of transparent unit 16, according to an exemplary embodiment. Transparent unit 16 is shown to include a front panel 18, a rear panel 20, and a transparent LCD panel 22.

Transparent LCD panel 22 may be a single layer or multi-layer panel that includes an LCD screen for presenting visual content (e.g., video, images, etc.). LCD panel 22 may receive control signals (e.g., startup signals, data signals, etc.) from a controller 38 and may be configured to present the visual content in response to the control signals. Transparent LCD panel 22 can be used to present various types of electronic content such as product information (e.g., pricing, nutritional value, etc.), advertisements (e.g., video advertisements, image advertisements, text advertisements, etc.), store layout information, and/or other forms of visual media. Advantageously, transparent LCD panel 22 can be used to present electronic content to a user (e.g., a customer at a supermarket, retail store, etc.) while allowing the user to see through transparent LCD panel 22 and view the items contained within storage device 10.

Transparent LCD panel may include a number of different layers or panes of glass, plexiglass or other suitable transparent or semi-transparent materials. The layers may be laminated to one another and/or held in position by a LCD panel frame 36. In some embodiments, LCD panel 22 includes a reinforcing layer of glass or a transparent polymer adhered thereto to improve strength and reduce strain (e.g., in the event that display case door 12 is impacted or slammed). The reinforcing layer may improve the rigidity of LCD panel 22 such that LCD panel 22 has the strength and structural integrity of a double-laminated panel.

In some embodiments, transparent LCD panel 22 is used as the center panel of a three-pane unit (i.e., between front panel 18 and rear panel 20). By using transparent LCD panel 22 as the center panel, LCD panel 22 is protected from impact damage (e.g., by shopping carts or other objects) and moisture damage (e.g., from condensation when display case door 12 is opened, from atmospheric air humidity, etc.). Additionally, mounting LCD panel 22 between front panel 18 and rear panel 20 may increase the visible transmittance of LCD panel 22.

In other embodiments, LCD panel 22 is not the center panel. For example, transparent LCD panel 22 may be located in front of both front panel 18 and rear panel 20 or behind both front panel 18 and rear panel 20. In some embodiments, LCD panel 22 may be adhered or laminated to the outside panel or the inside panel of a triple pane refrigerator door. In another embodiment, transparent unit 16 can include more than three panels or panes. For example, transparent LCD panel 22 can be inserted between the first and second or second and third panels in a triple pane refrigerator door.

Front panel 18 and rear panel 20 may be made from glass (e.g., insulated glass, tempered glass, etc.), plastics, or other transparent or substantially transparent materials. In some embodiments, front panel 18 and rear panel 20 include a transparent portion 34 and an opaque portion 32. Opaque portion 32 may be formed, for example, by screen printing, by applying another type of coating (e.g., dot matrix decorating, roller printing, ink jet printing, painting, etc.), and/or by applying a decal to a surface of front panel 18 and/or rear panel 20. Opaque portion 32 may hide or obscure the margin of LCD panel 22 (e.g., frame 36, edges of the LCD screen, etc.) as well as any other components which may be positioned between front panel 18 and rear panel 20 (e.g., spacers 24-28, insulation 30, etc.).

Each of panels 18-22 includes a front surface and a rear surface. As shown best in FIG. 4, front panel 18 includes a front surface 40 and a rear surface 42, rear panel 20 includes a front surface 44 and a rear surface 46, and transparent LCD panel 22 includes a front surface 48 and a rear surface 50. Front surfaces 40, 44, and 48 face toward a customer when display case door 12 is closed whereas rear surfaces 42, 46, and 50 face toward storage device 10 when display case door 12 is closed. In some embodiments, opaque portion 32 may be formed by applying a coating to surfaces 42 and 44 (i.e., the interior surfaces of front panel 18 and rear panel 20). In other embodiments, opaque portion 32 may be formed by applying an opaque coating to any other surfaces (e.g., in addition to or in place of surfaces 42 and 44) or by using opaque materials to form opaque portion 32.

Still referring to FIGS. 2-4, transparent unit 16 is shown to include three panels. However, in various embodiments, transparent unit 16 may include a greater or lesser number of panels. For example, transparent unit 16 may be a two-pane unit (e.g., transparent LCD panel 22 and one other transparent or substantially transparent panel, two traditional non-LCD panels, etc.), a three-pane unit (e.g., as shown in FIG. 2 or with three non-LCD panels), a four-pane unit (e.g., transparent LCD panel 22 and three traditional non-LCD panels), a five-pane unit, a six-pane unit, or a unit having any other number of panes or panels. Transparent unit 16 may include any combination of transparent LCD panels and/or traditional non-LCD panels.

In some embodiments, panels 18-22 may be outfitted with an anti-condensate device. Coolers are a type of refrigerated display case which operate at a temperature of approximately 38° F. Freezers are another type of refrigerated display case which operate below 0° F. If the external surface of transparent unit 16 is colder than the temperature of the air external to display case door 12, moisture from the outside air may condense on the surface of transparent unit 16. In some embodiments, one or more of panels 18-22 includes an electrically-conductive coating (e.g., a pyrolitic coating or other similar coating) to prevent condensation from occurring. The electrically-conductive coating can be applied by spraying, adhering, laminating, or otherwise depositing the coating (e.g., using chemical vapor deposition) on any of surfaces 40-50.

To provide electricity to the coating, transparent unit 16 may include parallel bus bars (e.g., top and bottom, left and right side, etc.). The bus bars may be spaced apart from one another and adhered to the electrically-conductive coating. Each bus bar may include a lead assembly or solder tab for adhering wires that are in communication with an electrical source. In this arrangement, electric current may pass through one of the lead assemblies, to a first of the bus bars, across the electrically-conductive coating to the second bus bar, and through the other lead assembly. The electric current may cause heat to be generated across panels 18-22 (e.g., due to electrical resistance of the coating), which may assist in preventing condensation on panels 18-22. An exemplary bus bar system is described in greater detail in U.S. Pat. Nos. 6,606,832, and 6,606,833, which are incorporated by reference herein for their descriptions thereof.

In some embodiments, panels 18-22 are configured to maximize visible light transmission through transparent unit 16 to a customer, thereby improving the ability of customers to view display items within storage device 10 and content presented via LCD panel 22. However, it is also desirable to minimize the transmission of non-visible light (i.e., ultraviolet and infrared light) through transparent unit 16 in order to improve thermal performance (e.g., by reducing radiation heat transfer) and to protect the items stored therein.

In some embodiments, panels 18-22 may be configured to use non-visible wavelengths of light to heat panels 18-22, thereby reducing or preventing condensation. For example, one or more of panels 18-22 may include an ultraviolet (UV) inhibitor. A UV inhibitor may increase the shelf life of products within storage device 10 by preventing ultraviolet light from passing through display case door 12. The ultraviolet light may be absorbed or reflected by the UV inhibitor and may be used as a source of energy to heat panels 18-22. As another example, panels 18-22 may be treated with a low-emissivity heat-reflective coating to improve overall thermal resistance (e.g., by reducing radiation heat transfer) and/or to prevent external condensation.

In some embodiments, an anti-reflective coating may be applied to any of panels 18-22. The anti-reflective coating may absorb or transmit infrared light, ultraviolet light, or any combination thereof. In some embodiments, the anti-reflective coating may absorb or transmit some frequencies of visible light in addition to infrared and/or ultraviolet light.

Still referring to FIGS. 2-4, transparent unit 16 is shown to include a plurality of spacers 24-28. In some embodiments, spacers 24-28 include at least three different spacers (i.e., first spacer 24, second spacer 26, and third spacer 28). First spacer 24 may span the distance between front panel 18 and rear panel 20, second spacer 26 may span the distance between front panel 18 and LCD panel 22, and third spacer 28 may span the distance between LCD panel 22 and rear panel 20. Spacers 24-28 may be used to ensure an appropriate spacing between panels 18-22 and to prevent undesirable flexure thereof. For example, first spacer 24 may be adhered to surfaces 42 and 44 (i.e., the interior surfaces of front panel 18 and rear panel 20) and may be used to maintain a desired distance between front panel 18 and rear panel 20.

Figure 5:
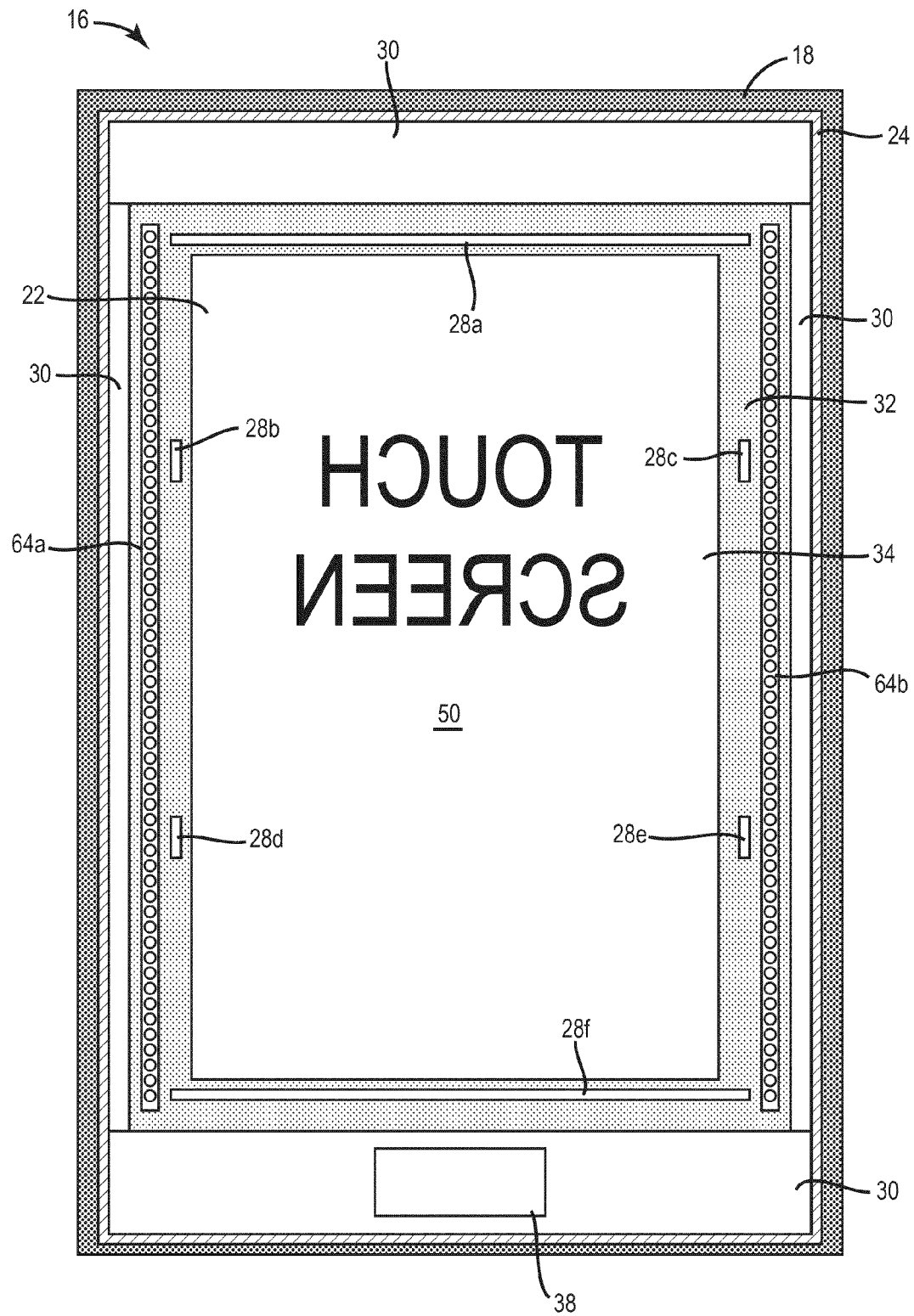
FIG. 5 is a rear elevation view of the transparent unit of FIG. 2 with the rear panel removed to show a lighting element attached to a rear surface of the transparent LCD panel, according to an exemplary embodiment.
Figure 9:
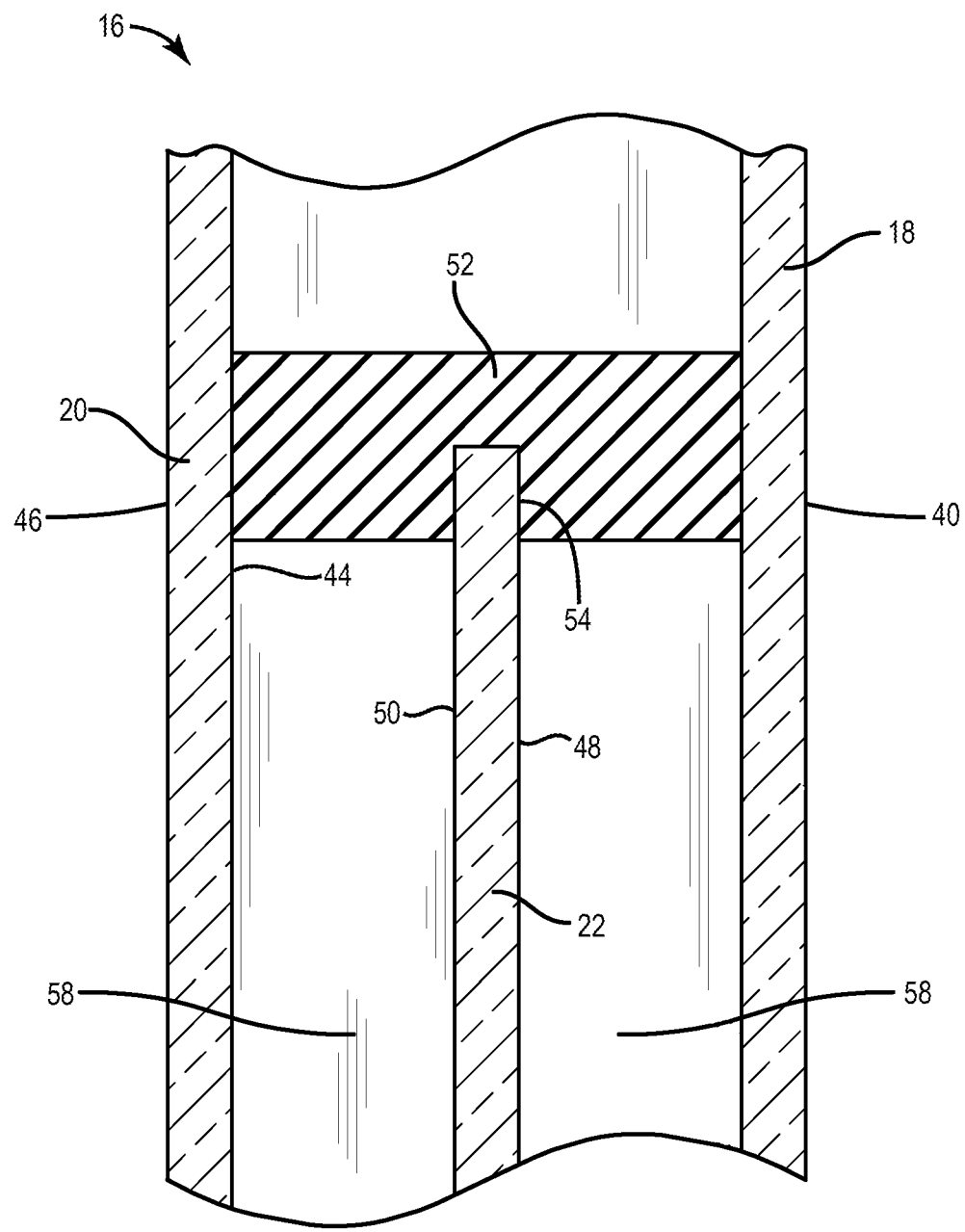
FIG. 9 is another cross-sectional plan view of the transparent unit of FIG. 2, illustrating a spacer configuration in which a single spacer is used to position the front panel, the rear panel, and the transparent LCD panel, according to an exemplary embodiment.

In some embodiments, spacers 24-28 form closed shapes. For example, FIG. 2 shows each of spacers 24-28 as a substantially rectangular frame. In other embodiments, one or more of spacers 24-28 may be replaced with a plurality of spacer segments (as shown in FIG. 5). In some embodiments, spacers 24-28 may be combined into a single spacer (as shown in FIG. 9).

In some embodiments, spacers 24-28 are made of an elastomeric material. The elastomeric material may help support and suspend transparent LCD panel 22 within display case door 12 and may prevent damage from shock and vibration when display case door 12 is opened and closed. In other embodiments, spacers 24-28 may be made of other materials such as polymers, metals, ceramics, or any combination thereof.

Still referring to FIGS. 2-4, transparent unit 16 is shown to include insulation 30. Insulation 30 may be thermal insulation, electrical insulation, magnetic insulation, or any combination thereof. Insulation 30 may be included between front panel 18 and rear panel 20 to reduce heat transfer through display case door 12. In some embodiments, LCD panel 22 is smaller than front panel 18 and rear panel 20 (e.g., a smaller height, a smaller width, etc.). Insulation 30 may be provided around LCD panel 22 (e.g., above, below, to the sides of, etc.) to fill empty space between front panel 18 and rear panel 20. Insulation 30 may include multiple sections and one or more cut-outs for housing electrical or mechanical components. For example, in FIGS. 2 and 3, insulation 30 is shown to include a cut-out 80 configured to house controller 38.

Insulation 30 may be formed from molded polyurethane foam, polystyrene bead, extruded polystyrene, or other similar material. In some embodiments, other types of insulation, such as superinsulation (e.g., silica aerogel) can be used in areas where bulky and/or conductive components require greater insulation in a limited space (e.g., to prevent external condensation in a refrigerator or freezer). In some embodiments, an insulating gas (e.g., argon, xenon, krypton, sulfur hexafluoride, etc.) may be used to fill the spaces between front panel 18 and rear panel 20. An insulating gas may be ideally suited for low temperature applications and may be used in addition to or in place of insulation 30 for insulating spaces around LCD panel 22.

As shown in FIG. 4, the insulating gas may be used to fill cavities 58 between front panel 18 and LCD panel 22 and between rear panel 20 and LCD panel 22. In operation, light from within display case door 12 may pass through cavities 58 before reaching a user. Advantageously, the insulating gas within cavities 58 may be transparent to visible light such that light from within display case door 12 is able to pass through cavities 58. The insulating gas may improve the thermal insulation of display case door 12 without impairing the functionality of LCD panel 22 and without preventing light from passing through cavities 58 and reaching a user.

In some embodiments, transparent unit 16 includes a seal 60. Seal 60 may hermetically seal cavities 58 to prevent external contamination (e.g., with dust, residue, pollution, chemicals, moisture, etc.) and to prevent the insulating gas within cavities 58 from escaping.

Still referring to FIGS. 2-4, in some embodiments, transparent unit 16 includes a touch screen 62. Touch screen 62 may be located in front of front panel 18 (e.g., along surface 40), behind front panel 18 (e.g., along surface 42), within front panel 18, or elsewhere within or external to transparent unit 16. Touch screen 62 may use any type of touch screen technology such as resistive, acoustic (e.g., surface acoustic, acoustic pulse, etc.), capacitive touch, projected capacitance (e.g., mutual capacitance, self capacitance, etc.), infrared (e.g., infrared grid, infrared acrylic projection, etc.), optical imaging, and/or dispersive signal technology. Exemplary touch screen technology is disclosed in U.S. Patent Publications No. 2009/0146945 and No. 2007/0216657, which are incorporated by reference herein for their descriptions of touch screen technology. In various embodiments, some or all of front panel 18 may be touch-sensitive Touch screen 62 may be configured to detect a user's proximity, movement, gestures, touch, or other forms of user interaction with display case door 12. For example, a user can touch the external surface of front panel 18 (i.e., surface 40) to interact with display case door 12. Touch screen 62 may be configured to transmit touch detection data to controller 38 for processing and interpretation. Touch screen 62 may be used to access an information system, retrieve product or nutritional information, view a store layout, or otherwise interact with display case door 12 and/or the electronic content presented via LCD panel 22.

In various embodiments, transparent unit 16 can be modified as necessary (e.g., resized, reshaped, components added or removed, etc.) for use with any type of door (e.g., a hinged door, a sliding door, a revolving door, an insulated door, a non-insulated door, a fire door, a security door, etc.) or door assembly. For example, transparent unit 16 may be implemented as part of an insulated door assembly for a refrigerator, multi-deck refrigerator, or freezer. In other implementations, transparent unit 16 may be used as a fixed window for a walk-in cooler, an insulated service deli case, a fixed product display window, or other non-door related applications.

In some embodiments, transparent unit 16 may include two or more LCD panels. The two or more LCD panels may be combined in a matrix to increase the visible display area. For example a 46" 16:9 standard TV size in a 30"×67" door leaves a large opaque margin above and below the LCD panel. Two smaller adjacent panels would leave more space for visible transmittance. Another way to increase the visible area is to cut down the long side of a larger 16:9 LCD panel to better fit the available display area within transparent unit 16.

In some embodiments, a series of display case doors 12 (e.g., along a supermarket aisle) can be synchronized to display related images on each of the display case doors 12 (e.g., similar to a JumboTron that displays an image or images on a series of adjacent screens). Controller 38 or another central control unit may communicate with each of the display case doors 12 to synchronize or coordinate the visual displays. For example, multiple display case doors 12 may be used to display a large image or video, with a portion of the image or video presented via each of display case doors 12.

Referring now to FIG. 5, a cross-sectional drawing of transparent unit 16 is shown, according to an exemplary embodiment. FIG. 5 illustrates a rear view of transparent unit 16 (e.g., from inside storage device 10) with rear panel 20 removed. In FIG. 5, transparent unit 16 is shown to include several components previously described with reference to FIGS. 2-4. For example, transparent unit 16 is shown to include front panel 18, spacer 24 attached to a rear-facing surface of front panel 18 (i.e., surface 42), insulation 30, transparent LCD panel 22, and controller 38.

Transparent unit 16 is shown to further include a lighting element 64. Lighting element 64 may include one or more light-emitting devices (e.g., light emitting diode (LED) strips, fluorescent light tubes, incandescent lights, halogen lights, etc.) configured to provide backlighting for transparent LCD panel 22 and/or to improve the presentation and display of the items within storage device 10. In some embodiments, lighting element 64 includes a plurality of LED strips 64a and 64b. LED strips 64a-64b may be vertically-oriented within transparent unit 16. In various embodiments, lighting element 64 may be attached to LCD panel 22 (e.g., to rear-facing surface 50), attached to spacer 28 (i.e. between LCD panel 22 and rear panel 20), or otherwise mounted within transparent unit 16 or external to transparent unit 16 (e.g., within storage device 10, attached to a mullion for display case doors 12, etc.). Lighting element 64 may be positioned behind opaque portion 32 of front panel 18 such that light emitted from lighting element 64 is not directly visible to a user.

As shown in FIG. 5, lighting element 64 may be attached to a rear-facing surface of LCD panel 22 between spacer 28 and insulation 30. In some embodiments, spacer 28 may be a substantially rectangular frame (as shown in FIG. 2). In other embodiments, spacer 28 may include a plurality of discrete (e.g., non-connected, separate, isolated, etc.) spacer segments 28a-28f (as shown in FIG. 5). Spacer segments 28a-28f may be separated from each other to allow light from lighting element 64 to pass between spacer segments 28a-28f and reach the portion of LCD panel 22 visible to a user. For example, light emitted from LED strip 64a may pass between spacer segments 28a and 28b, between spacer segments 28b and 28d, and between spacer segments 28d and 28f. Light emitted from LED strip 64b may pass between spacer segments 28a and 28c, between spacer segments 28c and 28e, and between spacer segments 28e and 28f.

Figure 6:
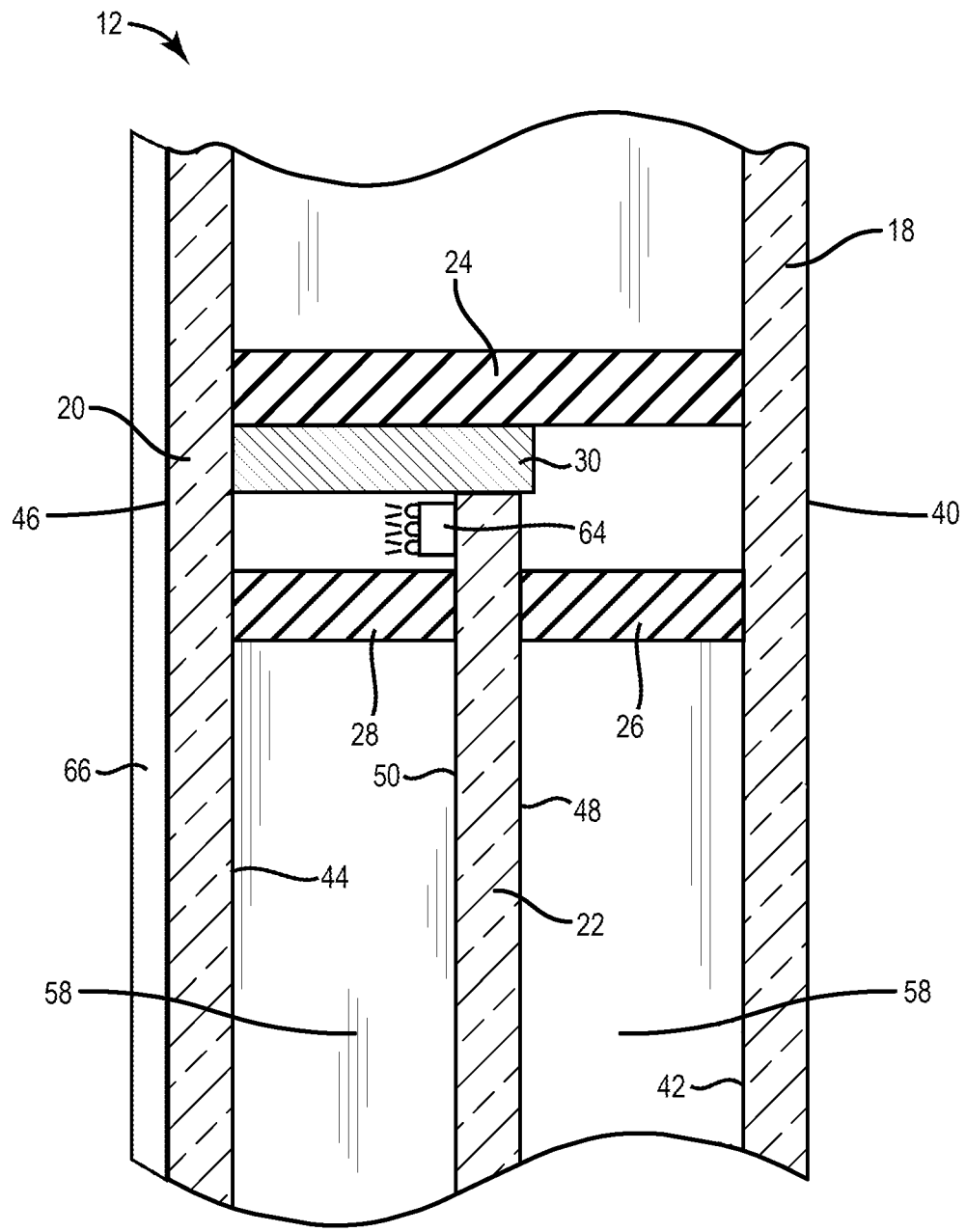
FIG. 6 is another cross-sectional plan view of the transparent unit of FIG. 2, illustrating in greater detail the attachment of the lighting element shown in FIG. 5 to the transparent LCD panel and showing a potential location for a light guide, according to an exemplary embodiment.

Referring now to FIG. 6, a cross-sectional plan view of display case door 12 is shown, according to an exemplary embodiment. In FIG. 6, lighting element 64 is shown attached to a rear-facing surface of LCD panel 22 between spacer 28 and insulation 30. In various embodiments, lighting element 64 may be positioned between spacer 28 and insulation 30, interior of spacer 28 (e.g., such that spacer 28 is between insulation 30 and lighting element 64), integrated with spacer 28 or insulation 30, or otherwise located between LCD panel 22 and rear panel 20. In some embodiments, lighting element 64 may be located behind rear panel 20 (e.g., attached to surface 46, attached to a separate panel behind rear panel 20, mounted within storage device 10, etc.).

Still referring to FIG. 6, in some embodiments, display case door 12 includes a light guide 66. Light guide 66 may be configured to guide the light emitted by lighting element 64 toward the items within storage device 10 and/or toward LCD panel 22. In some embodiments, light guide 66 is a light guide plate (e.g., made of glass, plexiglass or the like) that helps illuminate the images on LCD panel 22 by directing light from lighting element 64 through transparent LCD panel 22. In various embodiments, light guide 66 may be disposed along a front surface of rear panel 20 (i.e., surface 44), along a rear surface of rear panel 20 (i.e., surface 46), behind rear panel 20 (e.g., on another panel, within storage device 10, etc.), or otherwise positioned to receive light from lighting element 64.

In some embodiments, light guide 66 may include a switchable film or glass. The switchable film or glass may be configured to transition between an opaque state and transparent state based on whether voltage or electric current is applied. For example, when voltage or current is applied, the switchable film or glass may become clear. When the voltage or current is removed, the switchable film or glass may become opaque or frosted. Light guide 66 may be configured to selectively apply an electric voltage or current to the switchable film or glass based on control signals received from controller 38.

In some embodiments, light guide 66 includes a liquid crystal switchable film. An exemplary switchable film that may be used with light guide 66 is the 3G Switchable Film™ produced by Scienstry, Inc. of Richardson, Tex., USA. Another exemplary switchable film that may be used with light guide 66 is described in U.S. Pat. No. 5,270,843, the entirety of which is incorporated herein by reference.

In some embodiments, the switchable film is applied to a surface behind LCD panel 22 (e.g., using a lamination process, an optical adhesive, double sided tape, etc.). For example, the switchable film may be applied to surface 44 or surface 46 of rear panel 20. Lighting element 64 may be positioned between LCD panel 22 and light guide 66. In this position, light guide 66 can be transitioned between the opaque state and the transparent state (e.g., by a control signal received from controller 38) to function as a reflective/refractive surface and provide backlighting for LCD panel 22 (e.g. in the opaque state) and to provide lighting for items within storage device 10 (e.g., in the transparent state).

For example, if no voltage or current is applied, light guide 66 may be opaque (e.g., frosted, cloudy white, etc.), thereby preventing a user from seeing through display case door 12. In the opaque state, light emitted by lighting element 64 may be absorbed, dispersed, or reflected by light guide 64, thereby providing backlighting for LCD panel 22. In the opaque state, transparent LCD panel 22 may appear to be a typical LCD television. The opaque state facilitates the presentation of content via LCD panel 22 by reducing or eliminating the transmission of light from within storage device 10 through display case door 12.

If voltage or current is applied, light guide 66 may be transparent, thereby allowing a user to see through display case door 12 into storage device 10. In the transparent state, light emitted by lighting element 64 may be transmitted through light guide 66 to provide illumination and improve the presentation of the items within storage device 10.

Figure 7:
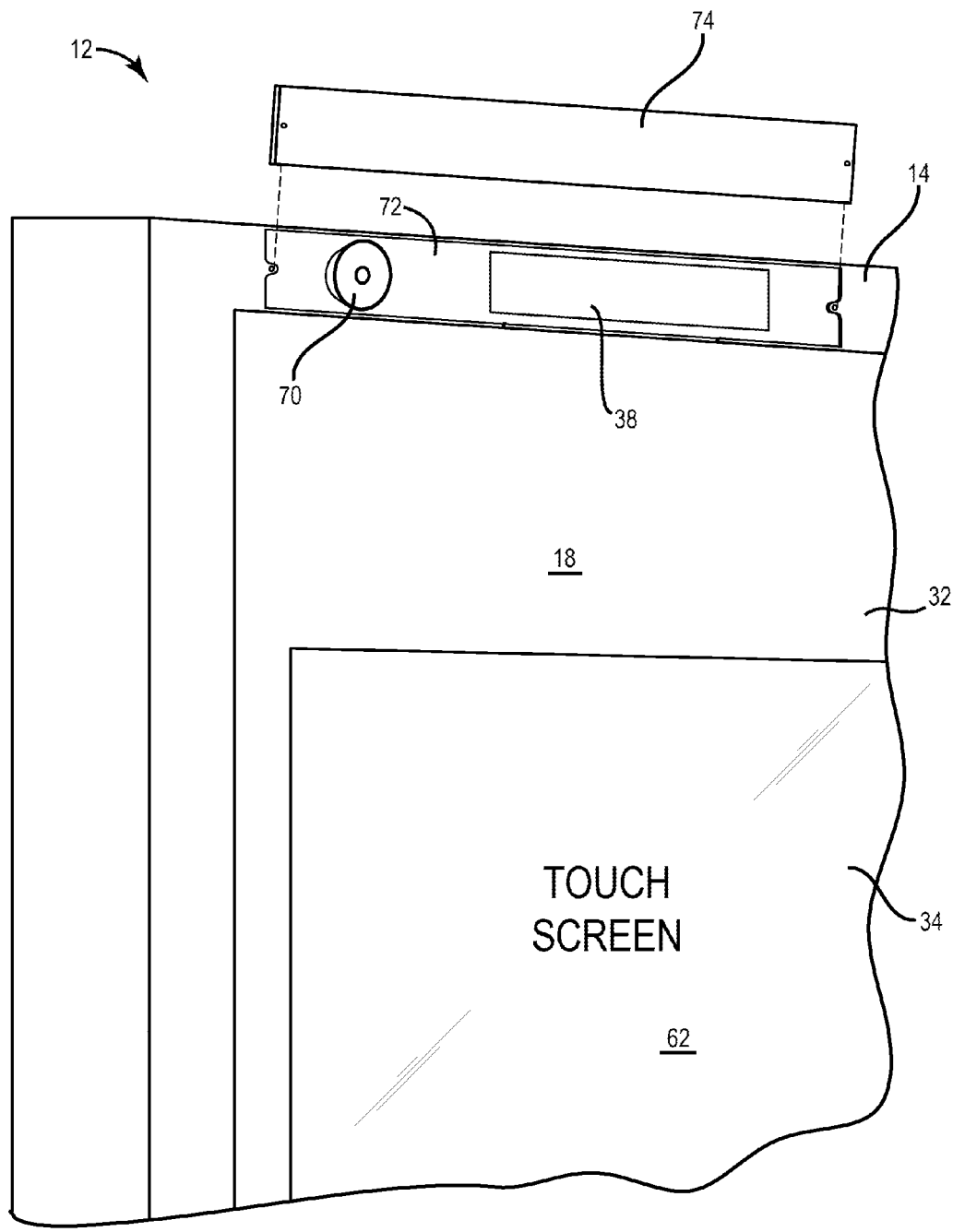
FIG. 7 is a perspective view of a door frame assembly including the transparent unit of FIG. 2, showing a speaker and a controller mounted within a door frame of the assembly, according to an exemplary embodiment.
Figure 8:
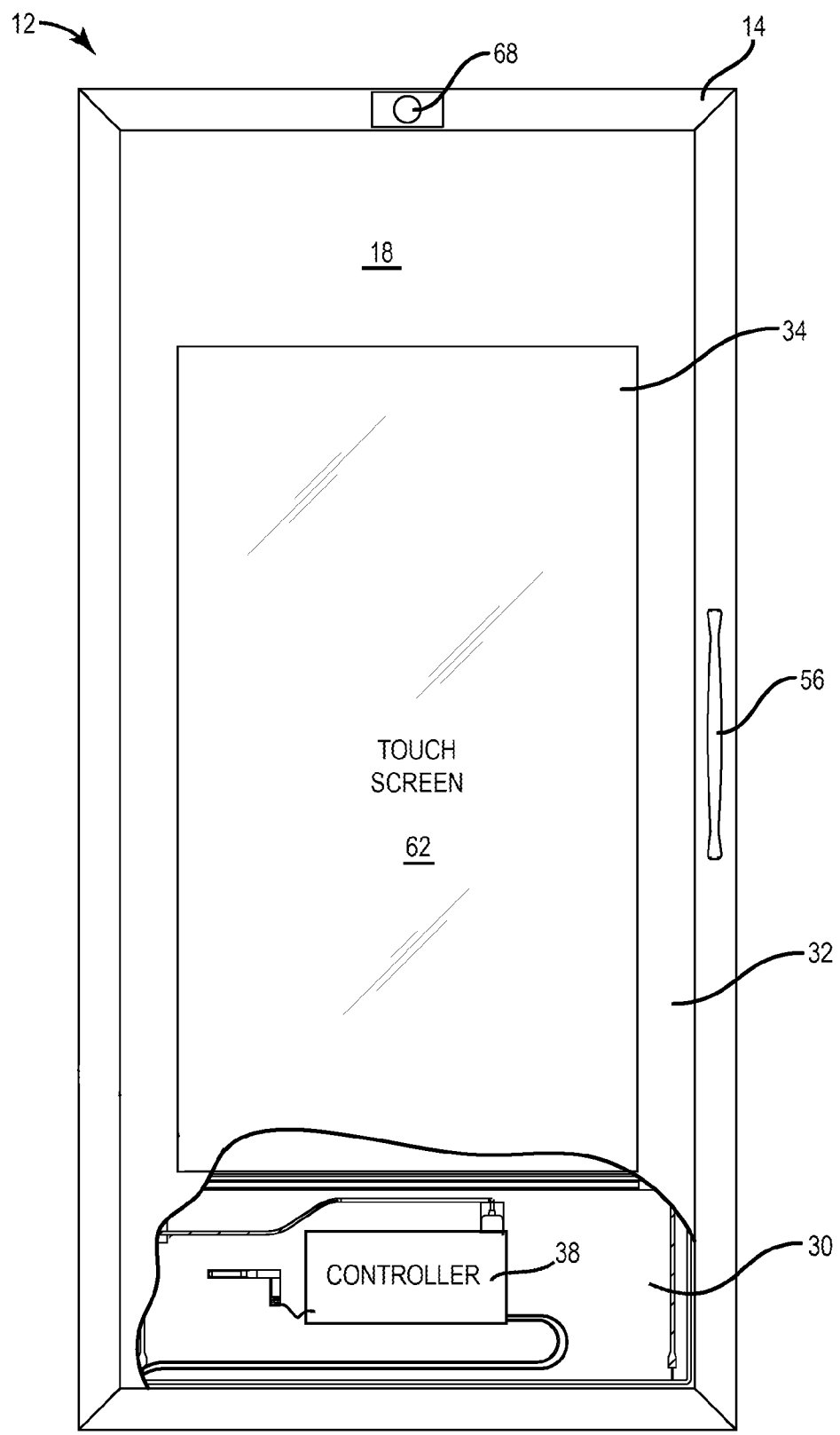
FIG. 8 is a front elevation view of the door frame assembly of FIG. 7, showing a sensor mounted within the door frame and the controller contained within the transparent unit, according to an exemplary embodiment.

Referring now to FIGS. 7-8, display case door 12 is shown to include a sensor 68 and a speaker 70, according to an exemplary embodiment. Sensor 68 may be an optical sensor (e.g., an infrared sensor, a visible light sensor, a sensor/emitter pair, etc.), a visual recognition camera, a motion sensor, a proximity sensor, a temperature sensor, a humidity sensor, or any combination thereof.

Sensor 68 may be configured to sense or detect a user nearby display case door 12. For example, if a user walks by or in front of display case door 12, sensor 68 may send a detection signal to controller 38. In some embodiments, sensor 68 is a visual recognition camera configured to capture visual images of a user in front of display case door 12. Controller 38 may use a data signal from sensor 68 to determine whether the user is a man or a woman. In some embodiments, controller 38 customizes the advertisements or other content presented via LCD panel 22 based on the information gathered via sensor 68 (e.g., based on whether the user is a man or woman, etc.).

Speaker 70 may be configured to play audio content. Speaker 70 may communicate various types of audio content such as music, sound effects, spoken words, audio advertisements, etc. In some embodiments, the audio content played by speaker 70 may supplement the visual content presented via LCD panel 22. In other embodiments, the audio content played by speaker 70 may be independent of the visual content presented via LCD panel 22. For example, in some embodiments, display case door 12 may not include a LCD panel and speaker 70 may be the only content output device used by display case door 12. Speaker 70 may receive data signals from controller 38 and may produce audio content in response to the data signals from controller 38.

Still referring to FIGS. 7-8, sensor 68 and/or speaker 70 may be mounted on or within door frame 14. For example, door frame 14 may include a hollow area 72 within which sensor 68 and/or speaker 70 may be positioned. Hollow area 72 may be covered with a cover 74 that is removably attached to door frame 14 by threaded fasteners or the like. Cover 74 can be removed to allow access to hollow area 72 and the electronic components contained therein for repair, upgrade, replacement, inspection, or other purposes. In some embodiments, controller 38 may be located within hollow area 72 rather than between front panel 18 and rear panel 20.

In some embodiments, speaker 70 is a traditional speaker including a driver, a diaphragm, and other traditional speaker components. In other embodiments, speaker 70 is an acoustic driver (i.e., an electroacostic transducer) configured to use a portion of panels 18-22 as the speaker diaphragm. For example, speaker 70 may include one or more individual transducers configured to vibrate a portion of panels 18-22 to create pressure waves (e.g., audible sound) rather than using a traditional speaker diaphragm. In various embodiments, the transducers may be attached to the rear surface of front panel 18 (i.e., surface 42) or any other surface of display case door 12 (e.g., surfaces 40-50, surfaces of another panel, etc.). The transducers may cause a portion of front panel 18 to vibrate, thereby producing sound waves emanating directly from front panel 18. The transducers may receive a control or data signal from controller 38 and may be configured to vibrate front panel 18 in response to the control or data signals.

In some embodiments, the transducers may be attached to opaque portion 32 of front panel 18 such that the transducers are hidden behind an opaque surface. In some embodiments, the transducers may be attached to a portion of front panel 18 that exhibits favorable acoustical or vibrational characteristics (e.g., based on the natural frequency of the selected portion of front panel 18, the stiffness or rigidity of the selected portion, etc.). For example, relatively high frequency transducers may be better suited for more rigid parts of front panel 18, whereas relatively low frequency transducers may be better suited for less rigid parts of front panel 18.

Referring now to FIG. 9, a cross-section of transparent unit 16 is shown, according to an exemplary embodiment. FIG. 9 illustrates an alternative configuration of spacers 24-28 in which spacers 24-28 are combined into a single spacer 52. Spacer 52 may span the distance between front panel 18 and rear panel 20 and may be adhered to surfaces 42 and 44. Spacer 52 is shown to include a detent 54 for receiving LCD panel 22. Detent 54 may hold LCD panel 22 in a stable position relative to front panel 18 and rear panel 20.

Figure 10:
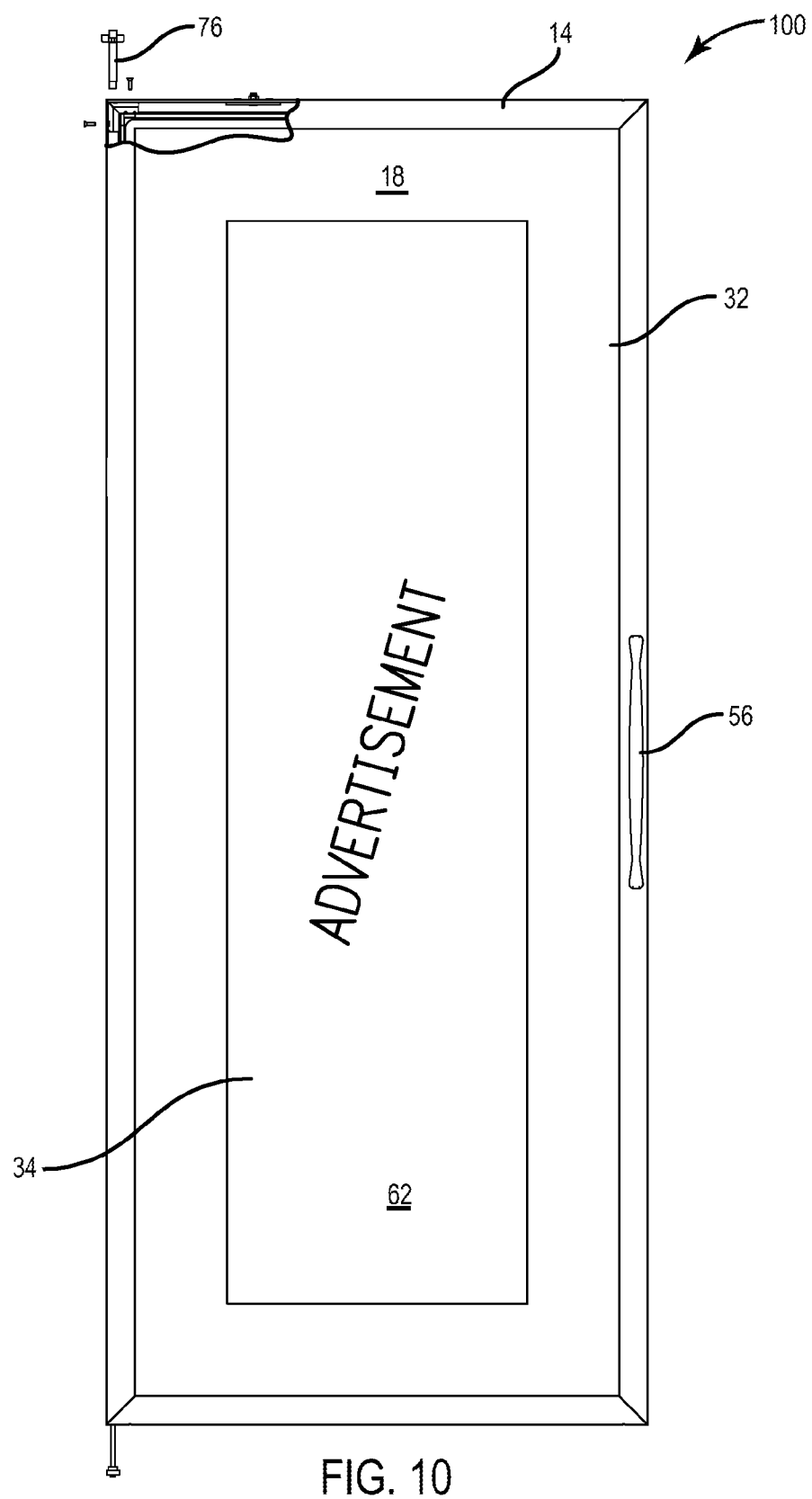
FIG. 10 is a front elevation view of the transparent unit of FIG. 2 with a hinge pin attached to upper and lower corners thereof, according to an exemplary embodiment.
Figure 11:
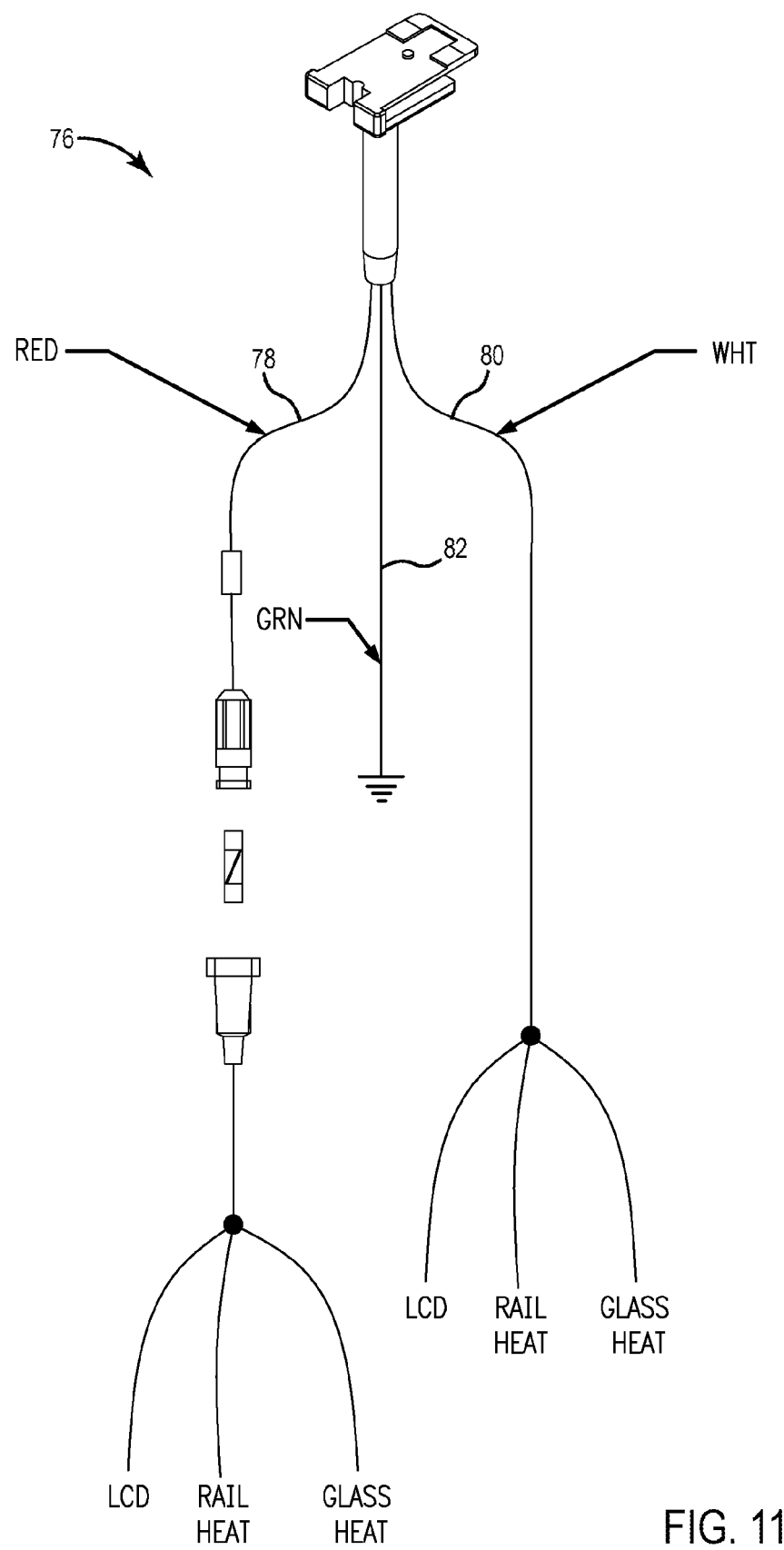
FIG. 11 illustrates the hinge pin of FIG. 10 in greater detail, showing multiple electrical conductors extending therethrough, according to an exemplary embodiment.

Referring now to FIGS. 10-11, a hinged electrical connection for display case door 12 is shown, according to an exemplary embodiment. As previously described, display case door 12 may include a variety of electrical and/or electronic components (e.g., LCD panel 22, controller 38, sensor 68, speaker 70, anti-condensate heaters, etc.). FIGS. 10-11 illustrate a mechanism for supplying power, electric current, voltage (e.g., 120VAC or 240VAC), and/or data to display case door 12 through a hinge pin 76.

Hinge pin 76 may be a hollow, slotted hinge pin configured to house one or more electrical conductors 78-82. As shown in FIG. 11, insulated electrical conductors 78-82 and/or wired communications can be directed through hinge pin 76 (e.g., via TCP/IP-type Internet communications). Electrical conductors 78-82 may pass axially through hinge pin 76 to deliver power and/or data to the electronic components within display case door 12. Advantageously, passing electrical conductors 78-82 through hinge pin 76 may reduce the flexing and fatigue stress/strain experienced by conductors 78-82 when compared with traditional power delivery systems.

In some embodiments, electrical conductors 78-82 are high voltage conductors that require appropriate insulation and spacing as dictated by UL and other safety certification organizations. For example, U.S. Pat. No. 4,671,582 to Stromquist et al., the entirety of which is incorporated by reference herein, discloses a hinge pin configured to house high voltage AC conductors. In other embodiments, conductors 78-82 may include one or more low voltage DC conductors (e.g., conductors having a voltage of 24V or less relative to ground) and a data cable (e.g., a CAT 5 cable, a CAT 6 cable, a coaxial cable, a fiber optic cable, or any other type of cable) configured to relay TCP/IP type communications.

In some embodiments, the case into which display case door 12 is mounted is prewired with low-voltage DC power supply (e.g., 12V, 24V, UL Class 2, etc.) so that it accepts a transparent LCD display case door 12 with power through hinge pin 76 or wired cords near the hinge pin 76. In some embodiments, all of the electrical components between front panel 18 and rear panel 20 may be powered by a power supply that supplies a relatively low amount of power (e.g., less than 200 W, less than 100 W, less than 50 W, etc.). Low voltage conductors can be used to power all electronic components of display case door 12. However, this is not a limitation on the present invention. For example, a high-voltage option can also be implemented. The electrical conductors passing through hinge pin 76 (e.g., power cables, data cables, etc.) may connect directly to various electrical components within display case door 12 or to an intermediary component (e.g., a controller, a power supply, etc.).

In some embodiments, hinge pin 76 can be omitted and a regular hinge pin can be used. For example, in an outside mount embodiment of display case door 12, the electronic components can be powered by (and data communicated therewith) a cord that does not run through the hinge pin. This type of door may be used, for example, on a self serve case at the end of a check out aisle in a store.

In some embodiments, some or all of the electronic components used in conjunction with display case door 12 (e.g., controller 38, sensor 68, speaker 70, a data storage device, a media player, a power supply, etc.) may be located external to display case door 12 and/or frame 14. For example, controller 38 and/or a data storage device used to store media presented via LCD panel 22 may be positioned at a remote location (e.g., on-site or off-site). Similarly, sensor 68, speaker 70, and/or a media player for display case door 12 may be remotely-located (e.g., external to display case door 12 and/or frame 14). Remotely-located components may be connected with display case door 12 directly or via a communications network (e.g., a local network, the Internet, etc.). In various embodiments, electronic components located external to display case door 12 may provide display case door 12 with power and/or data via electrical conductors which pass through hinge pin 76 or via a wireless communications link. In other embodiments, some or all of the electrical components may be located within display case door 12 (e.g., between front panel 18 and rear panel 20), mounted within frame 14, or otherwise combined with display case door 12.

Figure 12:
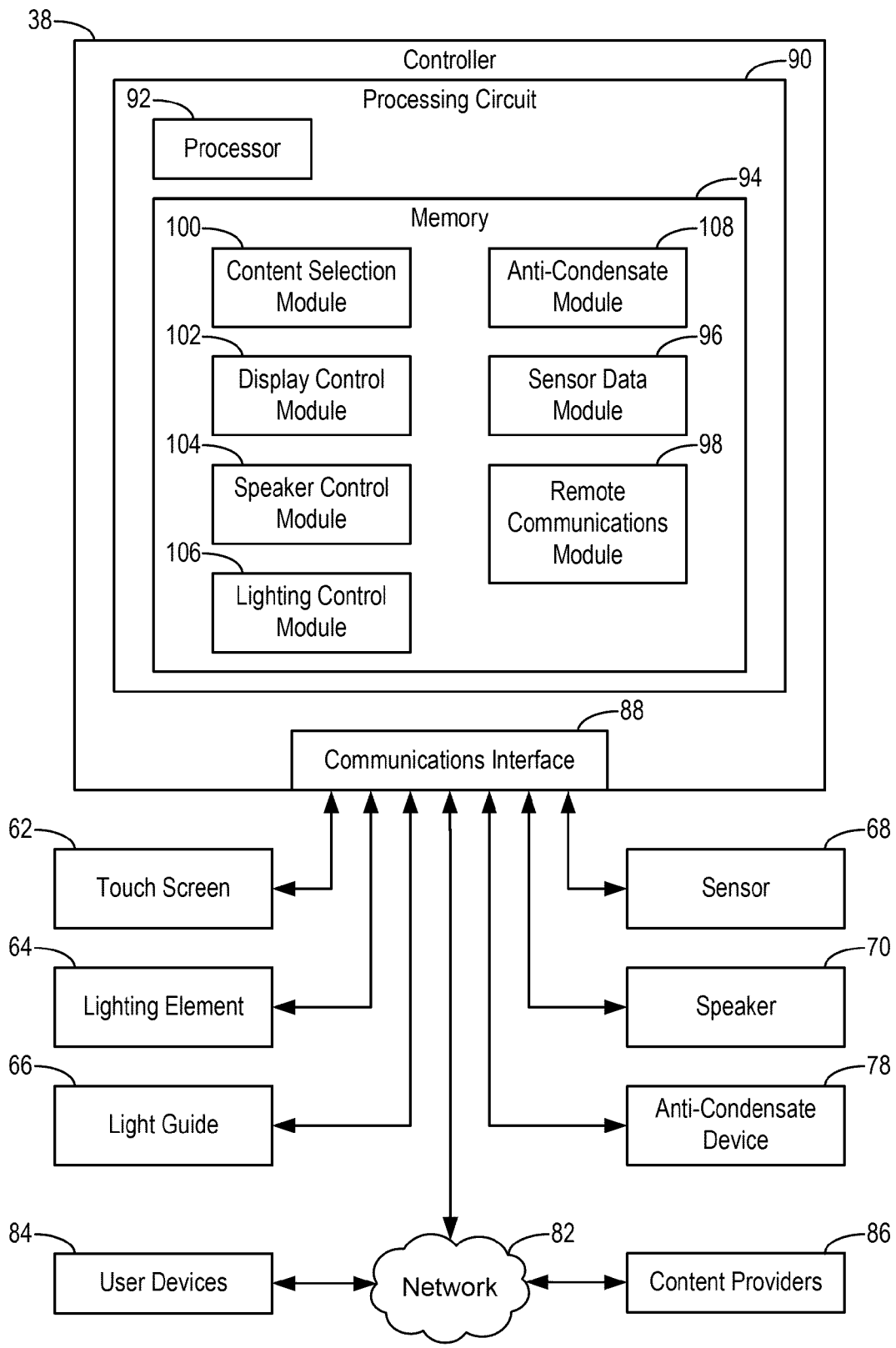
FIG. 12 is a block diagram illustrating a controller for various electronic components of the display case door, according to an exemplary embodiment.

Referring now to FIG. 12, a block diagram of controller 38 is shown, according to an exemplary embodiment. Controller 38 may be located within transparent unit 16 (e.g., in cut-out 80 as shown in FIG. 3), within door frame 14 (e.g., in hollow area 72 as shown in FIG. 7), or otherwise located within display case door 12 or exterior to display case door 12. In some embodiments, controller 38 is a local controller for a single display case door. In other embodiments, controller 38 may control multiple display case doors 12. For example, controller 38 may be a supervisory controller for a building management system including display case doors 12. In some embodiments, controller 38 is part of a distributed control system with the various functions and components of controller 38 distributed across several different control devices.

Still referring to FIG. 12, controller 38 is shown to include a communications interface 88 and a processing circuit 90. Communications interface 88 may include wired or wireless interfaces (e.g., jacks, antennas, transmitters, receivers, transceivers, wire terminals, Ethernet ports, WiFi transceivers, etc.) for conducting data communications with local or remote devices or systems. Communications interface 88 may be used to communicate with a wireless networking device (e.g., a wireless router, wireless-enabled computer, laptop, tablet, cell tower, etc.) and/or a wired networking device (e.g., via an Ethernet cable, a SATA cable, USB cable, or other physical data connection).

Communications interface 88 may be configured to receive data from various electronic devices. For example, communications interface 88 may receive sensory data from sensor 68 (e.g., motion detection data, proximity detection data, visual imaging data, temperature data, humidity data, lighting data, etc.), touch data from touch screen 62 (e.g., data indicating user interaction with a particular portion of touch screen 62, etc.), content-related data from content providers 86 (e.g., updated media content for presentation via LCD panel 22), and/or other types of electronic data (e.g., data from user devices 84, from network 82, etc.). Controller 38 may use the data received via communications interface 88 to determine appropriate control actions and/or data outputs for various operable components of display case door 12.

Communications interface 88 may be configured to provide control signals and/or data signals to LCD panel 22, lighting element 64, light guide 66, anti-condensate device 78, and speaker 70. For example, controller 38 may use communications interface 88 to provide visual content data (e.g., product information, pricing, nutritional value, advertisements, store layout information, visual media, etc.) to LCD panel 22 and audio content data to speaker 70. Controller 38 may use communications interface 88 to provide control signals to lighting element 64 (e.g., instructing lighting element 64 to turn on or off), light guide 66 (e.g., causing light guide 66 to transition between an opaque state and a transparent state), and anti-condensate device 78 (e.g., causing anti-condensate device 78 to activate or deactivate to provide heat to panels 18-22).

Communications interface 88 may be configured to conduct electronic data communications with a communications network 82. Network 82 may be a local area network (LAN), a wide area network (WAN), a cellular network, a satellite network, a radio network, the Internet, or any other type of data network or combination thereof. Network 82 may include any number of computing devices (e.g., computers, servers, routers, network switches, etc.) configured to transmit, receive, or relay data. Network 82 may further include any number of hardwired and/or wireless connections. For example, controller 38 may communicate wirelessly (e.g., via WiFi, cellular, radio, etc.) with a transceiver that is hardwired (e.g., via a fiber optic cable, a CAT5 cable, etc.) to a computing device of network 82. Network 82 may be used to receive content from content providers 86 and to communicate with user devices 84.

Still referring to FIG. 12, controller 38 is shown to include a processing circuit 90. Processing circuit 90 is shown to include a processor 92 and memory 94. Processor 92 may be implemented as a general purpose processor, an application specific integrated circuit (ASIC), one or more field programmable gate arrays (FPGAs), a CPU, a GPU, a group of processing components, or other suitable electronic processing components.

Memory 94 may include one or more devices (e.g., RAM, ROM, Flash® memory, hard disk storage, etc.) for storing data and/or computer code for completing and/or facilitating the various processes, layers, and modules described in the present disclosure. Memory 94 may comprise volatile memory or non-volatile memory. Memory 94 may include database components, object code components, script components, or any other type of information structure for supporting the various activities and information structures described in the present disclosure. In some implementations, memory 94 is communicably connected to processor 92 via processing circuit 90 and includes computer code (e.g., data modules stored in memory 94) for executing one or more control processes described herein. For example, memory 94 is shown to include a sensor data module 96, a remote communications module 98, a content selection module 100, a display control module 102, a speaker control module 104, a lighting control module 106, and an anti-condensate module 108.

Still referring to FIG. 12, memory 94 is shown to include a sensor data module 96. Sensor data module 96 may include instructions for receiving and storing sensor data from sensor 68, touch screen 62, and/or other sensory input devices. Sensor data module 96 may receive input signals via communications interface 88. In some embodiments, the sensor data may be received as an analog data signal. Sensor data module 96 may include an analog-to-digital converter for translating the analog signal into a digital data value. Sensor data module 96 may segment a continuous data signal into discrete measurement values by sampling the sensor data periodically (e.g., once per second, once per millisecond, once per minute, etc.). In some embodiments, sensor data module 96 converts the sensor input data into different format using a conversion formula, a translation table, or other conversion criteria.

In some embodiments, sensor data module 96 may attach a time stamp to the sensor input data to organize the data by time. If multiple input devices are used to acquire sensor data, sensor data module 96 may assign an identifier (e.g., a label, tag, etc.) to each measurement to organize the data by source. For example, the identifier may signify whether the sensor data is received from touch screen 62, sensor 68, or any other sensory input device.

Still referring to FIG. 12, memory 94 is shown to include a remote communications module 98. Remote communications module 98 may include instructions for conducting electronic data communications with remote systems and devices via communications interface 88. For example, remote communications module 98 may communicate with user devices 84, content providers 86, or other networked devices (e.g., via network 82). Remote communications module 98 may receive and store media content from content providers 86. The media content may be stored in a local or remote database for subsequent presentation via LCD panel 22 and/or speaker 70. Remote communications module 98 may interact with user devices 84 to provide diagnostic information, to allow user devices 84 to make changes to configuration settings, to report diagnostic information or content presentation statistics, to update system software, or to facilitate any other type of interaction with user device 84 as may be desirable in various implementations.

Still referring to FIG. 12, memory 94 is shown to include a content selection module 100. Content selection module 100 may include instructions for determining which content to present via LCD panel 22 and/or speaker 70. Content selection module 100 may select one or more visual content items (e.g., videos, images, text, etc.) to display to a user via LCD panel 22 and one or more audio content items (e.g., music, sound effects, etc.) to emit via speaker 70. In some embodiments, content selection module 100 uses the sensor data stored by sensor data module 96 to select content items. For example, content selection module 100 may use the sensor data to identify whether a user in front of display case door 14 is a man or woman and may select a corresponding content item based on the identification.

In some embodiments, content selection module 100 selects a content item based on user input received via touch screen 62. For example, a user may interact with touch screen 62 to request product information, nutritional information, store layout information, or other information accessible by controller 38. Content selection module 100 may respond to the user's request for information by causing the requested information to be presented via LCD panel 22.

In some embodiments, content selection module 100 selects one or more products (e.g., product advertisements, product images, product information, etc.) to present to a user via LCD panel 22. Content selection module 100 may select the products according to product selection criteria. In some implementations, the product selection criteria includes criteria for selecting products that are estimated to be most likely to invoke a purchase, a conversion event, a commercial interaction, or other desirable interaction by the user. In some implementations, the product selection criteria includes criteria for selecting products that are most relevant (e.g., products that are estimated to be appealing, interesting, enticing, etc.) to a particular user.

In some embodiments, content selection module 100 identifies products which are most relevant to a particular user using information specific to the particular user (i.e., "user-specific information"). User-specific information may include, for example, user demographics, user preferences, user behavior data, user profile data, user location data, or other information relating to a particular user. A user may input a user identifier (e.g., by entering a user ID number, scanning a bar code or card, etc.) to allow content selection module 100 to identify a particular user and select relevant products accordingly.

In some embodiments, content selection module 100 selects content for presentation via a single display case door 14. In other embodiments, content selection module 100 coordinates content presentation by a series of display case doors 14. For example, content selection module 100 may select content which is presented on multiple LCD panels 22 concurrently or content which is split into multiple portions (e.g., multiple sections of a large video feed) and delivered to multiple LCD panels 22 (e.g., using each LCD panel as a portion of a larger video display). Content selection module 100 may deliver a selected content item or an indication of a selected content item to display control module 102 and/or speaker control module 104.

Still referring to FIG. 12, memory 94 is shown to include a display control module 102. Display control module 102 may be configured to control LCD panel 22. Display control module 102 may receive media content from content selection module 100 and cause the selected media content to be presented via LCD panel 22. Display control module 102 may control LCD panel 22 to present any of a variety of media content including advertisements, product information, pricing information, nutritional information, store layout information, or any other visual information capable of being presented via LCD panel 22. Display control module 102 may control the media content presented on a single LCD panel or on multiple LCD panels.

Display control module 102 may communicate with content selection module 100 and/or sensor data module 96 to track the media content presented on LCD panel 22. For example, sensor data module 96 may record a sensory input indicating that a particular portion of touch screen 62 has been touched by a user. Display control module 102 may be used to determine the content associated with the touched portion of touch screen 62 (e.g., a menu button, an icon, etc.). The information maintained by display control module 102 may be used to associate touch screen inputs with particular actions (e.g., selecting a menu item, requesting product information, etc.).

Still referring to FIG. 12, memory 94 is shown to include a speaker control module 104. Speaker control module 104 may be configured to control speaker 70. Speaker control module 104 may receive media content from content selection module 100 and cause the selected media content to be emitted by speaker 70. In some embodiments, speaker control module 104 controls a traditional speaker (e.g., a speaker having a traditional voice coil, driver, diaphragm, and/or other speaker components). In other embodiments, speaker control module 104 controls an acoustic transducer that uses one of panels 18-22 as the speaker diaphragm.

Still referring to FIG. 12, memory 94 is shown to include a lighting control module 106. Lighting control module 106 may be configured to control lighting element 64 and/or light guide 66. Lighting control module 106 may determine when to activate, deactivate, adjust a brightness, or otherwise vary an output produced by lighting element 64. For example, lighting control module 106 may cause lighting element 64 to turn on at a particular time of day and to turn off at a different time of day. Lighting control module 106 may operate lighting element 64 according to a set lighting schedule, in response to input received from user devices 84, or in response to other types of input received via communications interface 88. For example, if sensor 68 does not detect a user for a predetermined period of time, lighting control module 106 may cause lighting element 64 to deactivate to conserve energy. If a user is subsequently detected by sensor 68, lighting control module 106 may cause lighting element 64 to activate in order to better illuminate the items within storage device 10 or to provide backlighting for LCD panel 22.

In some embodiments, lighting control module 106 controls the operation of light guide 66. Lighting control module 106 may cause light guide 66 to direct the light emitted from lighting element 64 toward the products within storage device 10 or toward LCD panel 22. For example, lighting control module 106 may cause light guide 66 to transition between an opaque state and a transparent state (e.g., by applying or removing voltage from a switchable film or glass component of light guide 66).

If no voltage or current is applied, light guide 66 may be opaque (e.g., frosted, cloudy white, etc.), thereby preventing a user from seeing through display case door 12. In the opaque state, light emitted by lighting element 64 may be absorbed, dispersed, or reflected by light guide 64, thereby providing backlighting for LCD panel 22. In the opaque state, transparent LCD panel 22 may appear to be a typical LCD television. The opaque state facilitates the presentation of content via LCD panel 22 by reducing or eliminating the transmission of light from within storage device 10 through display case door 12. In some embodiments, lighting control module 106 is configured to coordinate a transition into the opaque state with the presentation of media content on LCD panel 22. For example, lighting control module 106 may cause light guide 66 to transition into the opaque state to when media content is presented via LCD panel 22 to improve the visibility of the media content.

If voltage or current is applied, light guide 66 may be transparent, thereby allowing a user to see through display case door 12 into storage device 10. In the transparent state, light emitted by lighting element 64 may be transmitted through light guide 66 to provide illumination and improve the presentation of the items within storage device 10.

Still referring to FIG. 12, memory 94 is shown to include an anti-condensate module 108. Anti-condensate module 108 may be configured to control anti-condensate device 78. In some embodiments, anti-condensate device 78 includes an electrically-conductive coating (e.g., a pyrolitic coating or other similar coating) applied to one or more of panels 18-22 to prevent condensation from occurring. The electrically-conductive coating can be applied by spraying, adhering, laminating, or otherwise depositing the coating (e.g., using chemical vapor deposition) on any of surfaces 40-50. The anti-condensate device 78 may further include one or more parallel bus bars (e.g., top and bottom, left and right side, etc.). The bus bars may be spaced apart from one another and adhered to the electrically-conductive coating. Each bus bar may include a lead assembly or solder tab for adhering wires that are in communication with an electrical source.

Anti-condensate module 108 may be configured to apply a voltage across the bus bars, causing an electric current to flow across the electrically-conductive coating. The electric current may cause heat to be generated across panels 18-22 (e.g., due to electrical resistance of the coating), which may assist in preventing condensation on panels 18-22. In some embodiments, anti-condensate module 108 determines whether to apply or remove the electric current based on sensor data (e.g., temperature data, humidity data, etc.) measured by sensor 68. For example, if the humidity of the air outside storage device 10 has a humidity level greater than a threshold value, anti-condensate module 108 may activate anti-condensate device 78 to prevent condensation from occurring. The threshold value may be based on the dew point temperature of the outside air or other calculated or measured values.

Figure 13:
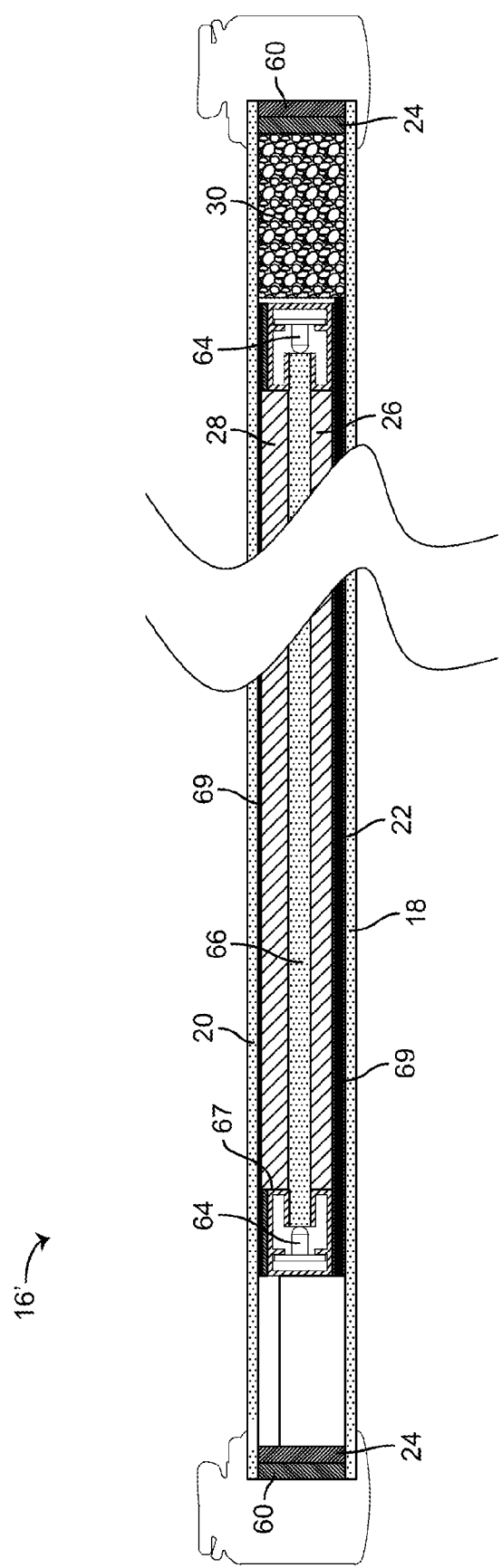
FIG. 13 is a cross-sectional plan view of the transparent unit of FIG. 2, according to another exemplary embodiment.

Referring now to FIG. 13, a cross-sectional drawing of a transparent unit 16' is shown, according to another exemplary embodiment. Transparent unit 16' includes many of the same features of transparent unit 16 as described with reference to FIGS. 2-6. For example, transparent unit 16' is shown to include a front panel 18, a rear panel 20, and a transparent LCD 22 panel positioned between front panel 18 and rear panel 20. Transparent unit 16' is shown to further include insulation 30, a spacer 24 spanning the distance between front panel 18 and rear panel 20, and a seal 60 around a perimeter of transparent unit 16'. In some embodiments, transparent LCD panel 22 may be positioned adjacent to front panel 18, as shown in FIG. 13. Transparent LCD panel 22 may be secured to front panel 18 by an adhesive or fastener 69 (e.g., bolts, screws, double-sided tape, glue, epoxy, etc.) or held in place by a geometric fitting.

Still referring to FIG. 13, transparent unit 16' is shown to include a lighting element 64 and a light guide 66. Lighting element 64 may include one or more light-emitting devices (e.g., light emitting diode (LED) strips, fluorescent light tubes, incandescent lights, halogen lights, etc.) configured to provide backlighting for transparent LCD panel 22 and/or to improve the presentation and display of the items within storage device 10. Light guide 66 may be a phosphorescent embedded material configured to direct the light emitted from lighting element 64 toward transparent LCD panel 22 and/or toward products within storage device 10.

In some embodiments, lighting element 64 and light guide 66 are located within transparent unit 16' (e.g., between front panel 18 and rear panel 20). For example, lighting element 64 and light guide 66 may be positioned between transparent LCD panel 22 and rear panel 20. As shown in FIG. 13, lighting element 64 may be positioned adjacent to light guide 66 (e.g., on one side, on both sides, above, below, etc.). Light emitted from lighting element 64 may pass through a side surface of light guide 66 and may be directed (e.g., scattered, deflected, redirected, etc.) by light guide 66 toward transparent LCD panel 22 and/or rear panel 20. Spacers 26 and 28 may be located on either side of light guide 66. For example, spacer 26 may be located between transparent LCD panel 22 and light guide 66. Spacer 28 may be located between light guide 66 and rear panel 20.

In some embodiments, lighting element 64 and/or light guide 66 may be attached to a housing 67. Housing 67 may be used to secure lighting element 64 and/or light guide 66 in a stable position relative to transparent unit 16'. Housing 67 may be positioned between transparent LCD panel 22 and rear panel 20, as shown in FIG. 13. In some embodiments, housing 67 includes a feature (e.g., a slot, a channel, a mounting surface, a corner, a rib, etc.) configured to receive and/or secure light guide 66. Housing 67 may also include a feature configured to receive and/or secure lighting element 64. In various embodiments, housing 67 may be attached to a rear surface of LCD panel 22, a front surface of rear panel 20, a side surface of spacers 26 or 28, to insulation 30, and/or to spacer 24. Housing 67 may be attached to various elements by an adhesive or fastener 69 (e.g., bolts, screws, double-sided tape, glue, epoxy, etc.) or held in place by a geometric fitting.

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A display case door assembly for a product storage device, the display case door assembly comprising:
    a transparent unit comprising a front panel, a rear panel, and a transparent LCD panel positioned between the front panel and the rear panel, wherein the transparent LCD panel is configured to present visual media content;
    a lighting element configured to provide lighting for the transparent LCD panel and for products within the product storage device; and
    a light guide configured to selectively direct light emitted from the lighting element toward the transparent LCD panel and the products within the product storage device;
    wherein the lighting element is attached to a surface of the LCD panel and configured to emit light in a direction away from the LCD panel and toward the products within the product storage device;
    wherein the light guide is configured to cause the light emitted by the lighting element to be reflected back toward the LCD panel and through the LCD panel.

2. The display case door assembly of claim 1, wherein the visual media content comprises at least one of: product information, pricing information, nutritional information, advertising content, and store layout information.

3. The display case door assembly of claim 1, wherein the lighting element comprises a LED strip positioned within the display case door assembly between the front panel and the rear panel.

4. The display case door assembly of claim 1, wherein the light guide is positioned within the display case door assembly between the front panel and the rear panel.

5. The display case door assembly of claim 1, wherein the light guide is operable in a first mode in which the light guide reflects the light emitted from the lighting element toward the LCD panel and away from the product storage device; and
    wherein the light guide is operable in a second mode in which the light guide allows the light emitted from the lighting element to pass through the light guide and into the product storage device.

6. The display case door assembly of claim 1, wherein the light guide comprises a switchable film configured to transition between a transparent state and an opaque state, wherein the switchable film is applied to at least one of: the front panel, the rear panel, and the transparent LCD panel;
wherein selectively directing light emitted from the lighting element toward the transparent LCD panel comprises transitioning the switchable film into the opaque state and using the switchable film in the opaque state to provide a backlight for the transparent LCD panel; and
wherein selectively directing light emitted from the lighting element toward the products within the product storage device comprises transitioning the switchable film into the transparent state and allowing the light emitted from the lighting element to pass through the switchable film and into the product storage device.

7. The display case door assembly of claim 1, further comprising:
a controller positioned between the front panel and the rear panel, wherein the controller is configured to control the visual media content presented via the transparent LCD panel.

8. The display case door assembly of claim 1, further comprising:
a controller located at a remote location and connected with the transparent LCD panel via a data communications link, wherein the controller is configured to control the visual media content presented via the transparent LCD panel.

9. The display case door assembly of claim 1, further comprising:
a speaker attached to the transparent unit, wherein the speaker is configured to present audio media content.

10. The display case door assembly of claim 1, further comprising:
a touch screen configured to receive touch-based input from a user;
wherein the visual media content presented by the transparent LCD panel is in response to user input received via the touch screen.

11. The display case door assembly of claim 1, further comprising:
a hollow hinge pin configured to rotatably couple the display case door assembly to the product storage device; and
one or more electrical conductors extending through the hollow hinge pin, the electrical conductors providing at least one of: power and data to the transparent LCD panel.

12. The display case door assembly of claim 1, wherein the transparent LCD panel, the lighting element, and the light guide are powered by a power supply that outputs a DC voltage of 24V or less.

13. A display case door assembly for a product storage device, the display case door assembly comprising:
a transparent unit comprising a front panel, a rear panel, and a transparent LCD panel positioned between the front panel and the rear panel, wherein the transparent LCD panel is configured to present visual media content;
a light guide configured to transition between an opaque state in which the light guide provides backlighting for the transparent LCD panel and a transparent state in which the light guide allows products within the product storage device to be viewed through the transparent LCD panel; and
a controller located external to the transparent unit and connected with the transparent LCD panel via a data communications link, wherein the controller is configured to control the visual media content presented via the transparent LCD panel.

14. The display case door assembly of claim 13, wherein the visual media content comprises at least one of: product information, pricing information, nutritional information, advertising content, and store layout information.

15. The display case door assembly of claim 13, further comprising:
a touch screen configured to receive touch-based input from a user;
wherein the visual media content presented by the transparent LCD panel is in response to user input received via the touch screen.

16. The display case door assembly of claim 13, further comprising a lighting element configured to provide lighting for the transparent LCD panel and for the products within the product storage device;
wherein, when the light guide is in the opaque state, the light guide reflects light emitted from the lighting element and causes the emitted light to pass through the transparent LCD panel; and
wherein, when the light guide is in the transparent state, the light guide does not reflect the light emitted from the lighting element and causes the emitted light to pass through the light guide toward the products within the product storage device.

17. The display case door assembly of claim 16, wherein the light guide is disposed between the lighting element and the products within the product storage device;
wherein the lighting element emits light in a first direction away from the transparent LCD panel and toward the products within the product storage device;
wherein, when the light guide is in the opaque state, the light guide reflects the light emitted by the lighting element in a second direction substantially opposite the first direction and toward the LCD panel.

18. The display case door assembly of claim 13, wherein the controller is configured to provide a control signal to the light guide causing the light guide to transition between the transparent state and the opaque state;
wherein the controller causes the light guide to transition into the opaque state when the visual media content is presented via the transparent LCD panel.

19. The display case door assembly of claim 18, wherein the controller causes the light guide to transition into the transparent state when the visual media content is not presented via the transparent LCD panel.

* * * * *